(12) United States Patent
Leary et al.

(10) Patent No.: US 11,502,453 B2
(45) Date of Patent: Nov. 15, 2022

(54) ELECTRICAL CONNECTOR LATCHING MECHANISM

(71) Applicant: POWERHYDRANT LLC, Boston, MA (US)

(72) Inventors: Kevin Walter Leary, Westwood, MA (US); Brian Hack, Somerville, MA (US); Aaron Cantrell, Easthampton, MA (US)

(73) Assignee: POWERHYDRANT LLC, Westwood, MA (US)

( * ) Notice: Subject to any disclaimer, the term of this patent is extended or adjusted under 35 U.S.C. 154(b) by 0 days.

(21) Appl. No.: 17/443,526

(22) Filed: Jul. 27, 2021

(65) Prior Publication Data

US 2022/0037832 A1 Feb. 3, 2022

Related U.S. Application Data

(60) Provisional application No. 63/057,468, filed on Jul. 28, 2020.

(51) Int. Cl.
| | | |
|---|---|---|
| *H01R 13/631* | (2006.01) | |
| *H01R 13/627* | (2006.01) | |
| *H01R 13/629* | (2006.01) | |
| *H01R 13/633* | (2006.01) | |

(52) U.S. Cl.
CPC ..... *H01R 13/6273* (2013.01); *H01R 13/6278* (2013.01); *H01R 13/62961* (2013.01); *H01R 13/631* (2013.01); *H01R 13/6335* (2013.01)

(58) Field of Classification Search
CPC .................................................... H01R 13/631
See application file for complete search history.

(56) References Cited

U.S. PATENT DOCUMENTS

| | | | | |
|---|---|---|---|---|
| 11,165,200 B2 * | 11/2021 | Weiss | ............... | H01R 13/62922 |
| 2022/0196194 A1 * | 6/2022 | Lafond | ............ | H01R 13/62944 |

\* cited by examiner

*Primary Examiner* — Ross N Gushi
(74) *Attorney, Agent, or Firm* — Atesa Legal PLLC

(57) ABSTRACT

A method for latching an electrical connector includes aligning a connector with an inlet. A first surface of the connector is within a first distance of a second surface of the inlet. A puller arm of the connector is extended into the inlet to a second distance from the second surface of the inlet. The puller arm includes a gripping element configured to apply a first compressive force against the inlet. The puller arm is retracted relative to the connector while applying the first compressive force against the inlet. The puller arm remains in the inlet at the second distance, thereby inserting a first electrode of the connector into the inlet to connect the first electrode with a second electrode of the inlet. The first electrode transfers power to the second electrode from a high-power supply.

20 Claims, 30 Drawing Sheets

ELECTRICAL CONNECTOR LATCHING MECHANISM

RELATED APPLICATIONS

This application claims the benefit of U.S. Provisional Patent Application No. 63/057,468 filed on Jul. 28, 2020 entitled "High-Power Charger Latching Mechanism," the content of which is incorporated herein by reference in its entirety.

FIELD

This disclosure relates generally to autonomous charging, and more specifically to a latching mechanism for autonomously connecting an electrical connector to an inlet having a high insertion force.

BACKGROUND

Electrically powered vehicles (EV) require rapid charging due to their limited range. Rapid charging often requires high currents to be transferred from a high-power source to an EV, where the charging cable has considerable weight. Furthermore, the high-power connectors and inlets associated with high current charging often require high insertion forces.

Typical electric charging stations require the vehicle's user to manually connect the vehicle to a charging station. EVs are also increasingly being allowed to operate semi or fully autonomously, with limited or no user intervention. To fully realize the potential of EVs and specifically autonomous vehicles, charging should occur with limited or no user intervention. Accordingly, high-power charging must overcome the high insertion forces in an autonomous manner while also addressing safety issues related to the high currents involved.

BRIEF SUMMARY

In one aspect, a method for latching an electrical connector comprises aligning a first colinear axis of a connector with a second colinear axis of an inlet, wherein a first surface of the connector is within a first distance of a second surface of the inlet, the first surface is parallel to the second surface and orthogonal to the first colinear axis. A puller arm of the connector is extended into the inlet to a second distance from the second surface of the inlet, wherein the puller arm comprises a gripping element configured to apply a first compressive force against the inlet. The puller arm is retracted relative to the connector while applying the first compressive force against the inlet, wherein the puller arm remains in the inlet at the second distance, thereby extending a first electrode of the connector into the inlet to connect the first electrode with a second electrode of the inlet. The gripping element is captured in a captured state preventing the first compressive force from being applied against the inlet.

In another aspect, an apparatus comprises a connector comprising a first surface, the first surface comprising a first colinear axis aligned with a second colinear axis of an inlet during an alignment step, wherein the first surface is within a first distance of a second surface of the inlet, the first surface parallel to the second surface and orthogonal to the first colinear axis. A puller arm is coupled to the connector and configured to extend into the inlet to a second distance from the second surface of the inlet during a gripping step. A gripping element is coupled to the puller arm and configured to apply a first compressive force against the inlet during the gripping step, wherein the puller arm is configured to retract relative to the connector during the gripping step, thereby extending a first electrode of the connector into the inlet to connect the first electrode with a second electrode of the inlet, the gripping element subsequently configured in a captured state to prevent the first compressive force from being applied against the inlet.

In another aspect, a method for latching an electrical connector comprises aligning a first colinear axis of a connector with a second colinear axis of an inlet, wherein a first surface of the connector is within a first distance of a second surface of the inlet, the first surface parallel to the second surface and orthogonal to the first colinear axis. A puller arm of the connector is extended into the inlet to a second distance from the second surface of the inlet, wherein the puller arm comprises a gripping element configured to apply a first compressive force against the inlet. The puller arm is retracted relative to the connector while applying the first compressive force against the inlet, wherein the puller arm remains in the inlet at the second distance, thereby extending a first electrode of the connector into the inlet to connect the first electrode with a second electrode of the inlet, wherein the first electrode transfers power to the second electrode from a high-power supply.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for the facilitation of autonomously connecting and latching a high-power charger (e.g., connector) to a chargeable device (e.g., inlet). In one non-limiting example, the chargeable device is part of an electric vehicle. In another non-limiting example, the charging method comprises a Megawatt Charging System (MCS). In some embodiments, the currents required to charge an electric vehicle are up to 3000 Amps, thus necessitating low gauge, heavy cabling and connectors. Heavy connectors are difficult to manipulate, even with robotic assistance. The conducting electrodes require high insertion forces due to the tight fit required for electrical contact, and the resulting friction. In addition, aging effects of connectors (e.g., in particular those exposed to harsh environments), increase the insertion force required to connect a charger to the vehicle. A variety of gripping elements are disclosed in the embodiments, which enable the connector to grip the inlet, and reliably pull electrodes of the connector and inlet together. Methods and apparatus to disengage the connector from the inlet are further disclosed, which requires the gripping element to be placed in captured state.

In some embodiments described herein, one or more cameras and/or computer vision systems are used to assist in aligning the connector (typically attached to a power supply), to an inlet of a chargeable device (e.g., an EV). In other embodiments, aligning the connector to the inlet may include manual alignment, or with use of registration marks or features. Reference is made to several styles of inlets, however this disclosure is applicable to other existing or future inlet technologies, including but not limited to "Charge de Move (CHAdemMO)" GB/T, J1772, IEC 62196, CCS1, CCS2 or EV proprietary inlets. Furthermore, the inlets may be connected to EVs, Hybrid EVs, aerial vehicles or battery systems.

In various embodiments described herein, a linear force or motion is applied to one or more of the connector, puller arms, second puller arms and the like. This linear force may be generated electromechanically, pneumatically, hydraulically, with springs, magnets, levers and the like. In the disclosed embodiments, torsional springs are used to deflect latch pawls, however in other embodiments, the latch pawls may be deflected with any type of spring, linear actuators, solenoids or motor driven linkages. Alignment of a colinear axes of a connector to an inlet includes alignment of centroid or another common feature of a respective connector and inlet, so that connector and inlet will align without offset.

First Embodiment

Figure 1:
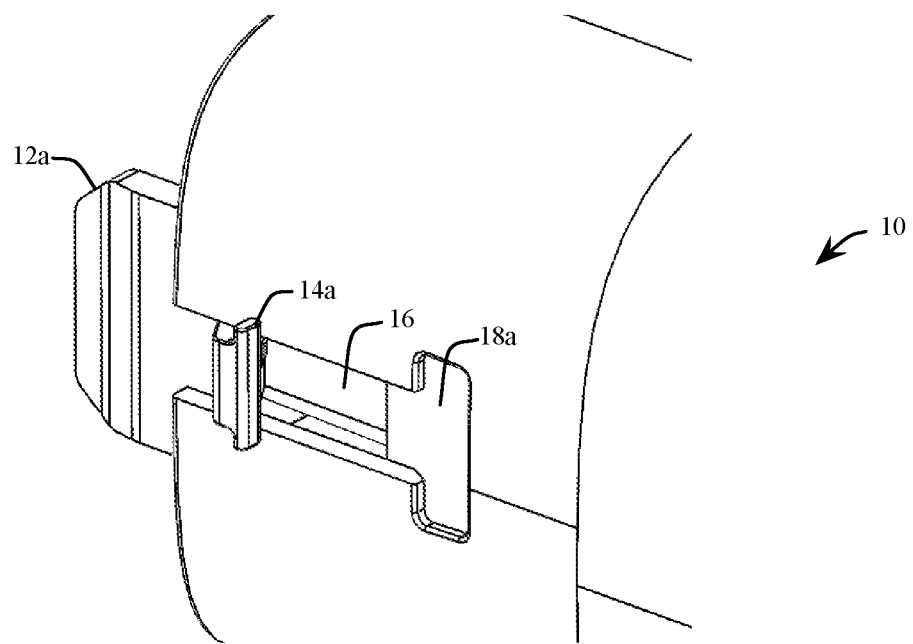
FIG. 1 are FIG. 2 are perspective views of a first example embodiment of a connector with a latch pawl in an open position.
Figure 2:
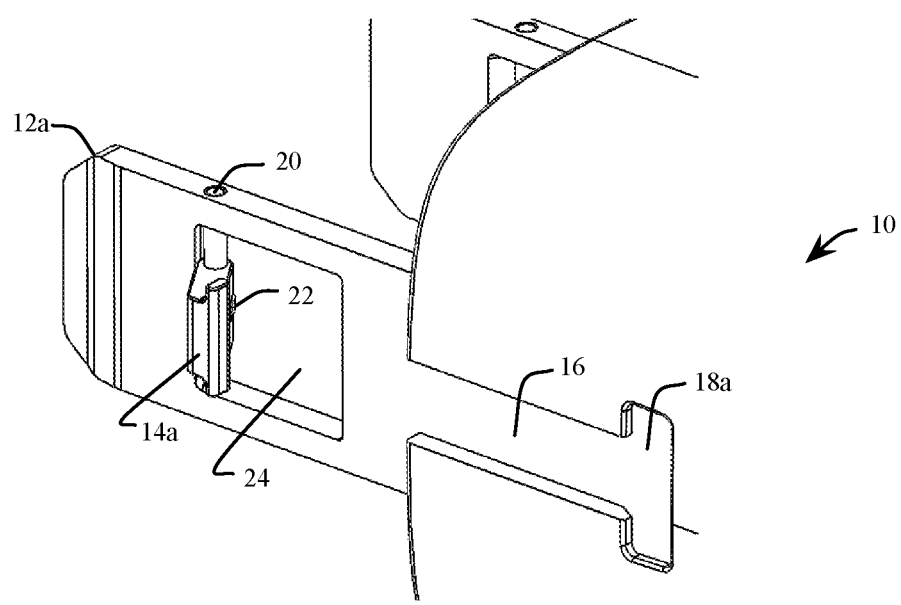

FIG. 1 shows an example embodiment of a connector 10 comprising a puller arm 12a. The connector 10 includes a latch pawl 14a (e.g., a gripping element) attached to the puller arm 12a and configured to slide along a first opening 16. In one embodiment, the puller arm 12a is made from light-weight Aluminum, and the latch pawl 14a is made from Chromium Molybdenum Steel ("Chrome-Moly"). When the puller arm 12a is fully retracted into the connector 10, the latch pawl 14a aligns with a second opening 18a having an area larger than an area of the latch pawl 14a measured on a same plane. FIG. 2 shows the connector 10 with the puller arm fully extended with the latch pawl 14a extending outward in a direction orthogonal to the puller arm 12a, and not constrained by the first opening 16. The latch pawl 14a is coupled to the puller arm 12a with a pin 20 and a torsional spring 22 configured to rotate the latch pawl 14a around the pin 20, in or out of a third opening 24.

Figure 3:
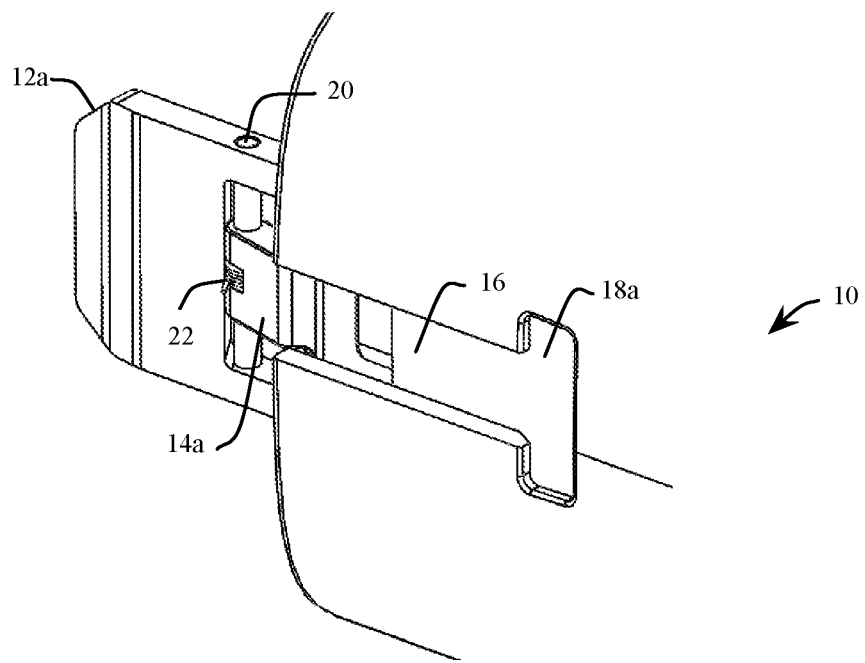
FIG. 3 are FIG. 4 are perspective views of the first example embodiment of the connector with the latch pawl in a captured state.
Figure 4:
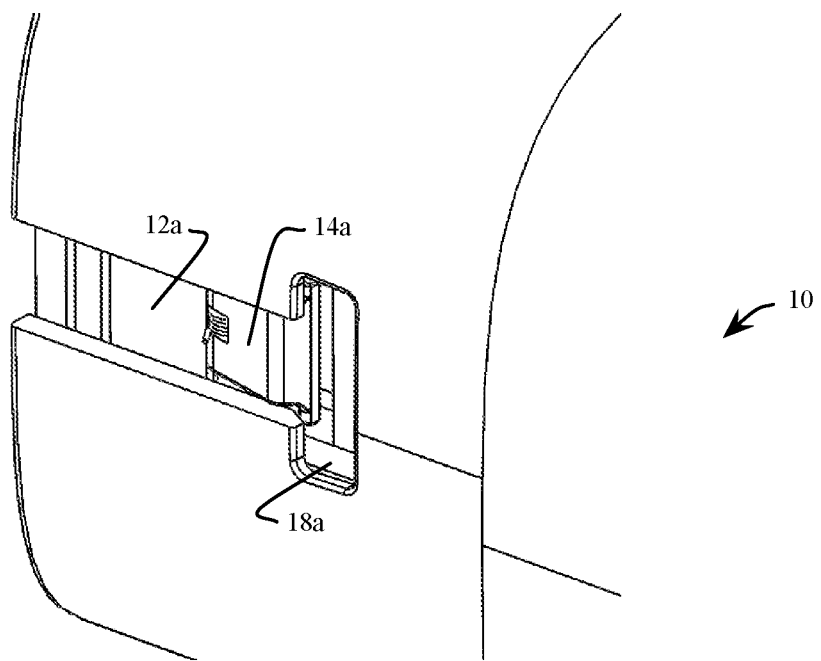

FIG. 3 shows the connector 10 with the latch pawl 14a in a captured state and the puller arm 12a partially retracted into the connector 10. FIG. 4 shows the connector 10 with the latch pawl 14a in the captured state and the puller arm 12a retracted further into the connector 10.

Figure 5:
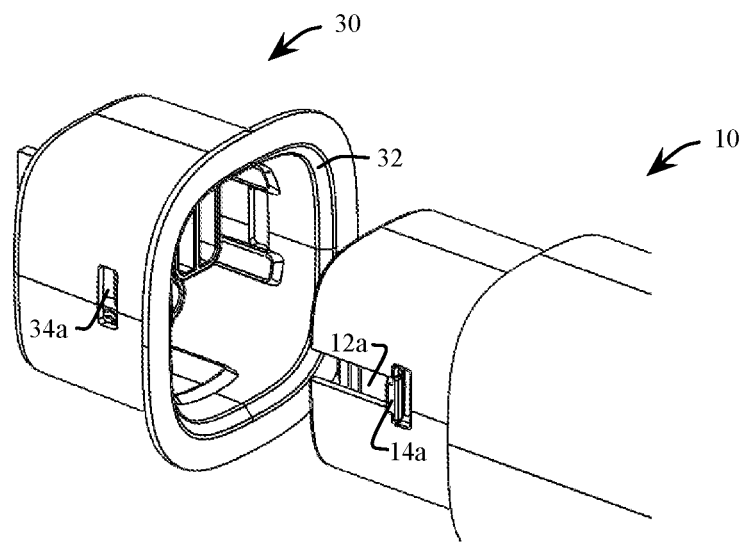
FIG. 5 and FIG. 6 are respective perspective and cross-sectional views of the connector approaching an inlet, in accordance with the first example embodiment of the present disclosure.

FIG. 5 shows the connector 10 aligned with an example embodiment of an inlet 30.

In one embodiment, the inlet 30 includes a chamfered edge 32 to facilitate the insertion of the connector 10 into the inlet 30. The inlet 30 includes a recessed portion 34a sized to receive the latch pawl 14a during a gripping step. In one embodiment, the recessed portion 34a is an opening through the inlet. In another embodiment, the recessed portion 34a is a milled section on the inside of the inlet 30.

Figure 6:
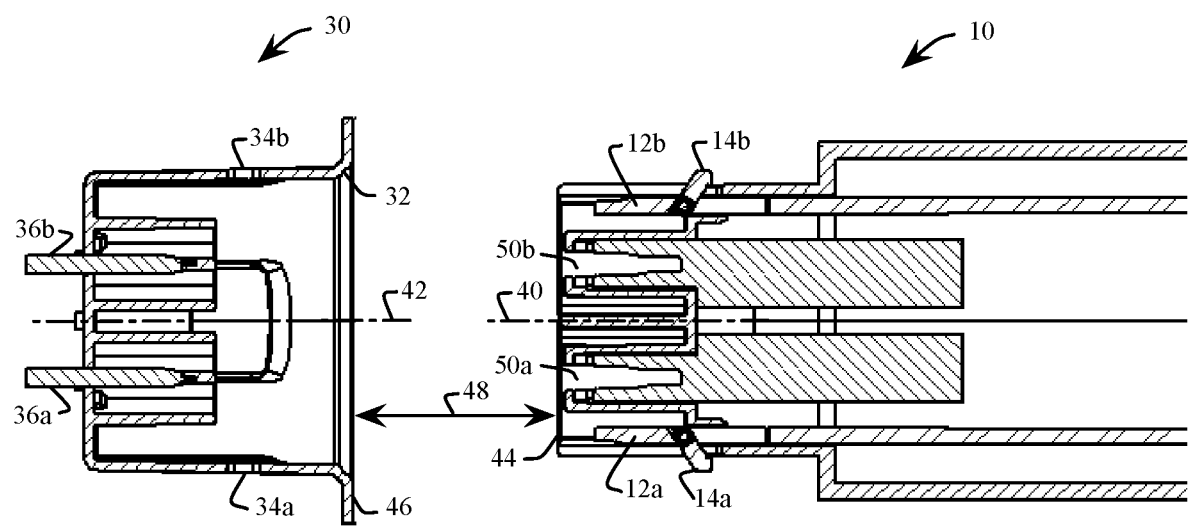

FIG. 6 shows the connector 10 aligned for insertion into the inlet 30. The connector 10 includes a first colinear axis 40 substantially aligned to a second colinear axis 42 of the inlet 30. A first surface 44 of the connector 10 and a second surface 46 of the inlet are within a first distance 48 (e.g., approximately 100 mm or less than 500 mm). The first surface 44 is substantially parallel to the second surface 46 and orthogonal to the first colinear axis 40. In other embodiments, the connector 10 and the inlet 30 are misaligned within typical manufacturing tolerances and environmental variations. FIG. 6 shows a pair of latch pawls 14a and 14b (generally 14) coupled to respective puller arms 12a and 12b (generally 12). The inlet 30 shows a pair of recessed portions 34a and 34b (generally 34) configured to receive corresponding latch pawls 14a and 14b. The connector 10 includes a pair of first electrodes 50a and 50b (generally 50) aligned to mate with the respective pair of second electrodes 36a and 36b (generally 36) of the inlet 30. In other embodiments, a different number of first and second electrodes are included from the example embodiment shown in FIG. 6. The example embodiment of the inlet 30 shows a Megawatt Charging System (MCS) inlet, however other inlet designs are envisioned within the scope of this disclosure. The pair of second electrodes 36a and 36b of the MCS inlet are configured to be a blade having a rectilinear cross-section. Other embodiments of the inlet 30 include a variety of shapes, configured as either male or female electrodes designed to couple with a corresponding male or female electrode of the connector 10.

Figure 7:
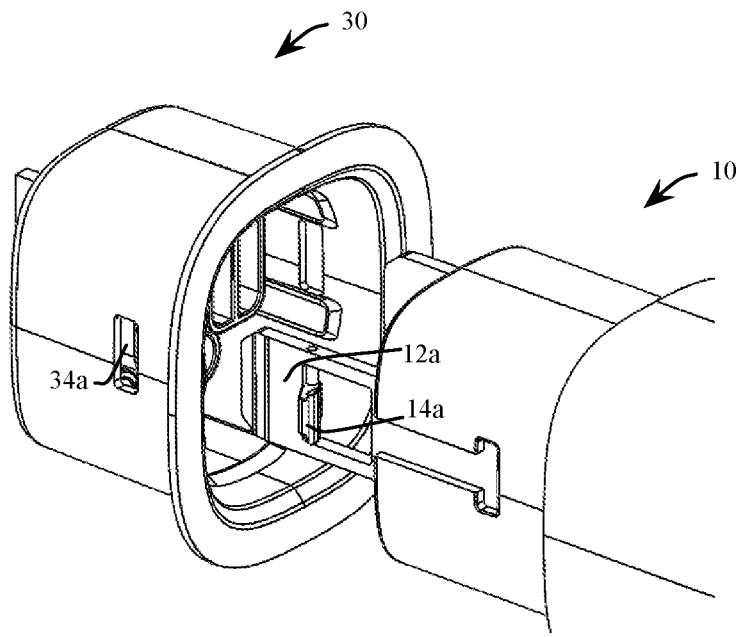
FIG. 7 and FIG. 8 are respective perspective and cross-sectional views of the connector with puller arms extended towards the inlet, in accordance with the first example embodiment of the present disclosure.
Figure 8:
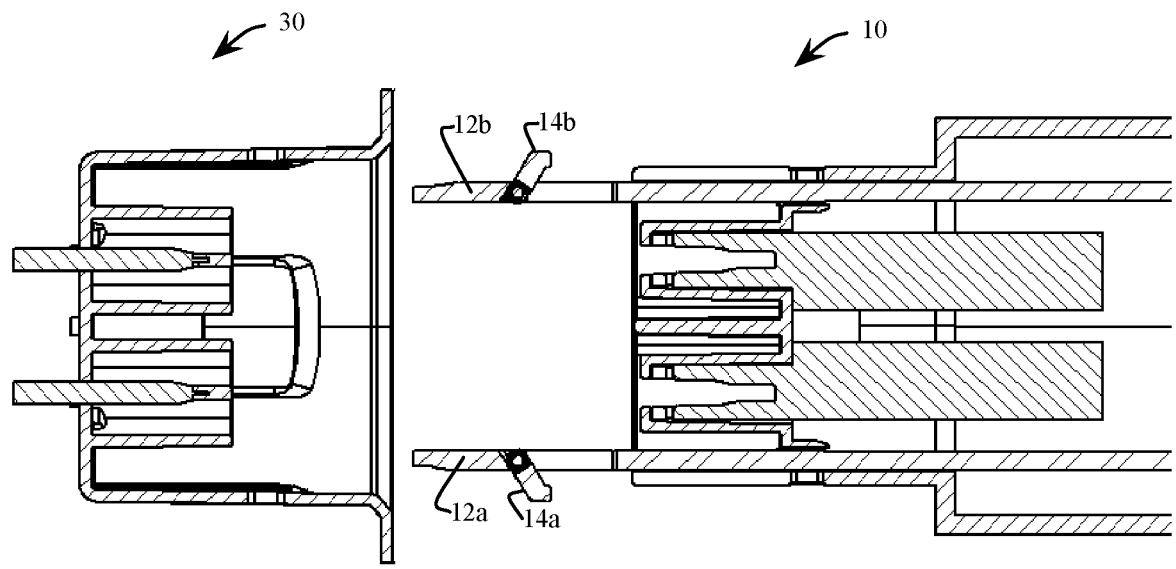
Figure 9:
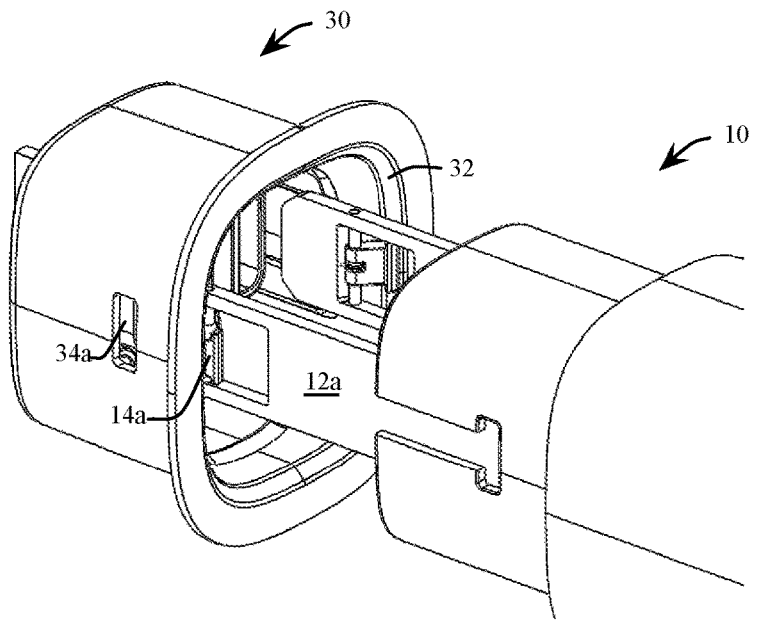
FIG. 9 and FIG. 10 are respective perspective and cross-sectional views of the connector with puller arms making initial contact with the inlet, in accordance with the first example embodiment of the present disclosure.
Figure 10:
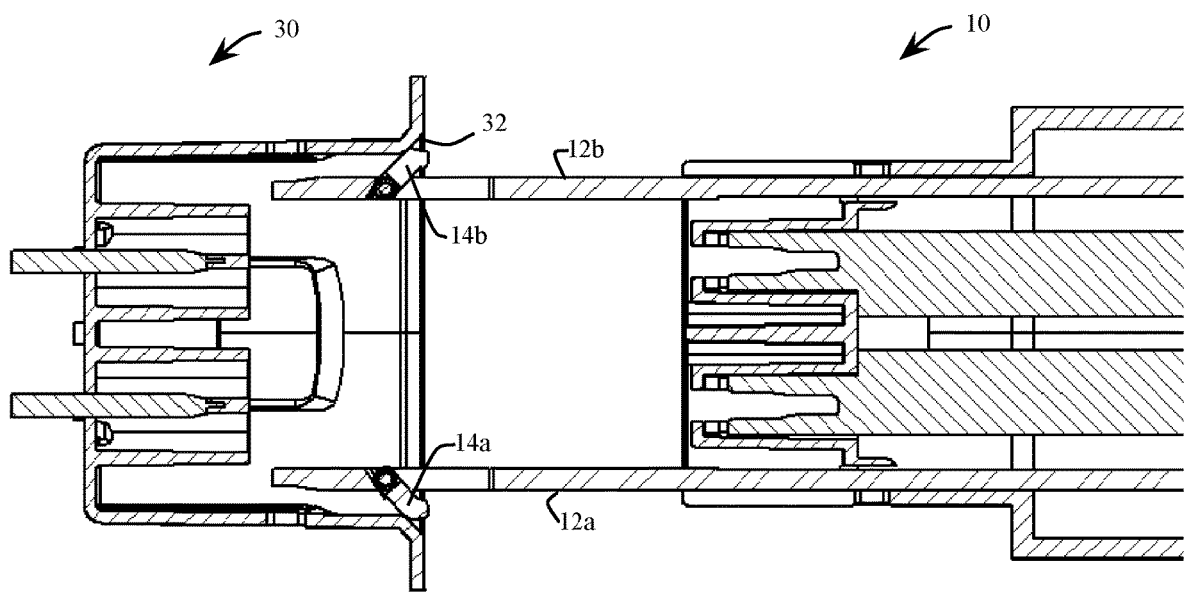

FIG. 7 and FIG. 8 show the connector 10 with puller arms 12 extended towards the inlet 30, in preparation for engagement between the connector 10 and the inlet 30. In one example, the puller arms 12 are extended from a resting position of 0 mm, (referenced to the first surface 44 of the connector 10) to 100 mm. FIG. 9 and FIG. 10 show the puller arms 12 making initial contact with the inlet 30 at a chamfered edge 32, by moving the connector 10 towards the inlet 30 with the puller arms extended as shown in FIG. 7 and FIG. 8.

Figure 11:
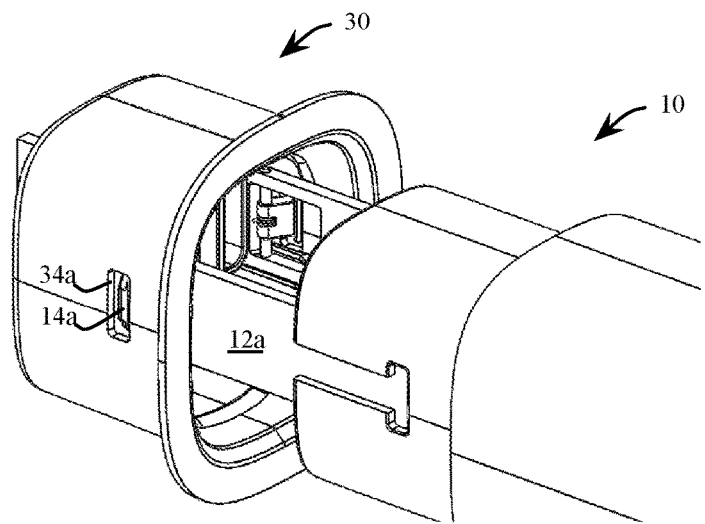
FIG. 11 and FIG. 12 are respective perspective and cross-sectional views of the connector with puller arms engaging with a recessed portion of the inlet, in accordance with the first example embodiment of the present disclosure.
Figure 12:
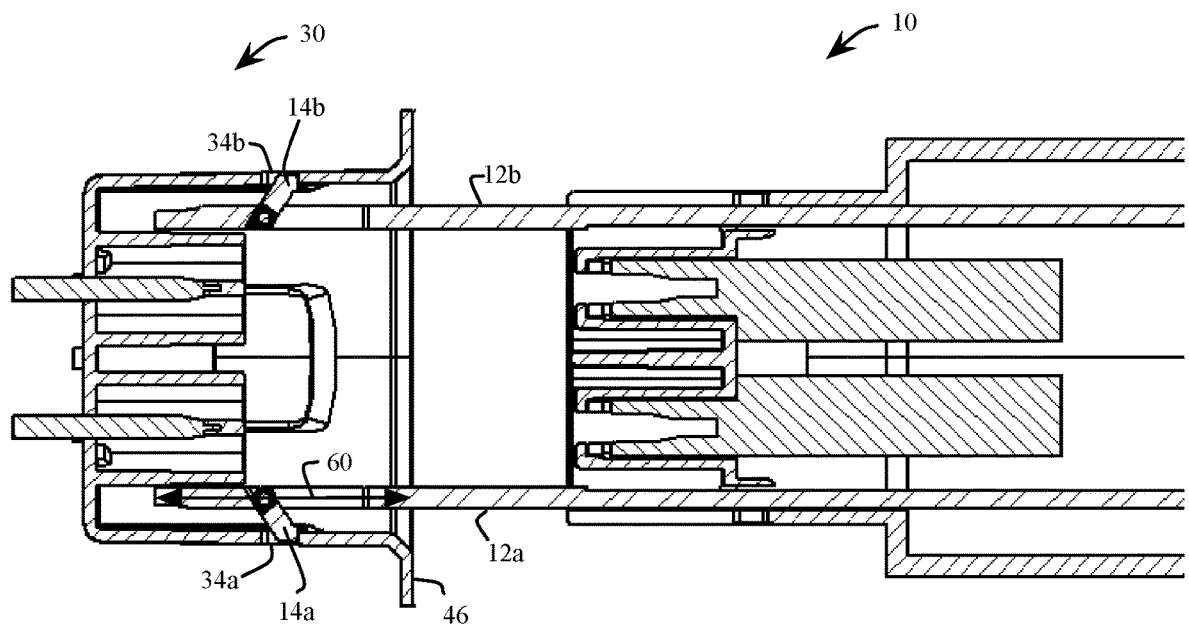
Figure 13:
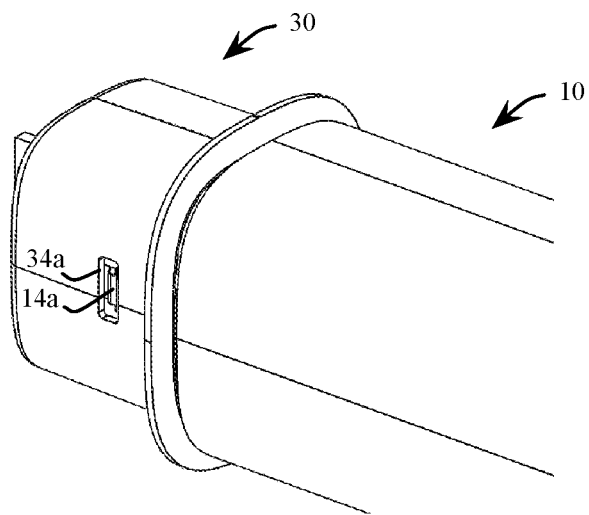
FIG. 13 and FIG. 14 are respective perspective and cross-sectional views of the connector pulled into the inlet by compressive force of the latch pawls, in accordance with the first example embodiment of the present disclosure.
Figure 14:
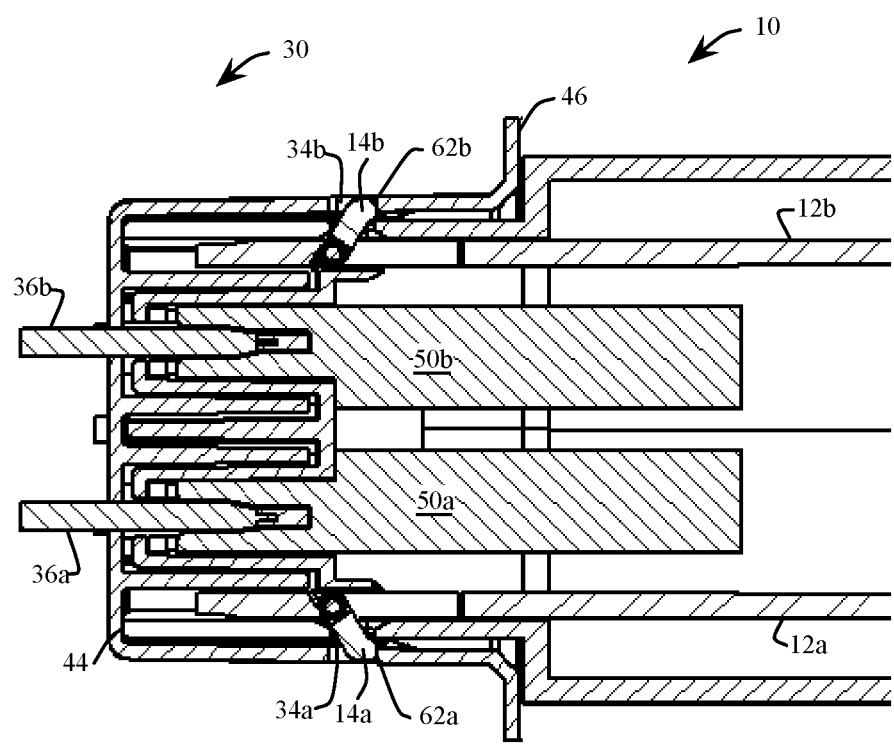

FIG. 11 and FIG. 12 show each puller arm 12 is extended into the inlet 10 by a second distance 60 measured from the second surface 46 of the inlet 30. Accordingly, each latch pawl 14 is aligned with, and extends into, a respective recessed portion 34 due the force of the torsional spring 22 on each latch pawl 14. FIG. 13 and FIG. 14 show the first electrodes 50 of the connector 10 pulled into contact with the second electrodes 36 of the inlet 30 by retracting the puller arms 12 into the connector 10, while applying a first compressive force on a surface 62a and 62b (generally 62) of the recessed portions 34. In one example embodiment, the first compressive force against the surfaces is equal to or greater than the force that the inlet 30 provides against the insertion of the connector 10. For example, electrode contact friction, manufacturing tolerances, corrosion, aging or gravity (e.g., from the weight of the connector 10 and related cabling) can provide resistance to the insertion of the connector 10 into the inlet 30. In one example embodiment, the high insertion and retraction force of coupling and decoupling the connector 10 with the inlet 30 is 10 lbs to 50 lbs. In one embodiment, the connector 10 is pulled into the inlet 30 until an insertion force of the first electrodes 50 into the second electrodes 36 exceeds a threshold.

Figure 15:
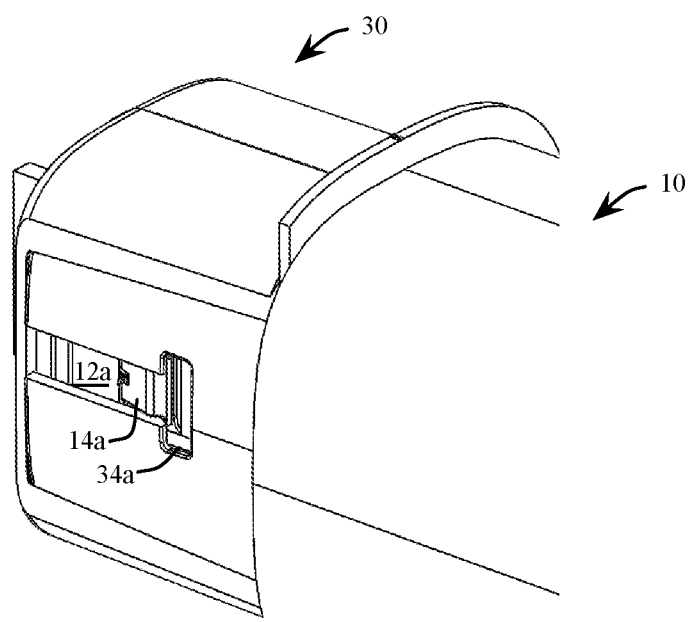
FIG. 15 and FIG. 16 are respective sectional-perspective and cross-sectional views of the connector with latch pawls in a captured state inside the inlet, in accordance with the first example embodiment of the present disclosure.
Figure 16:
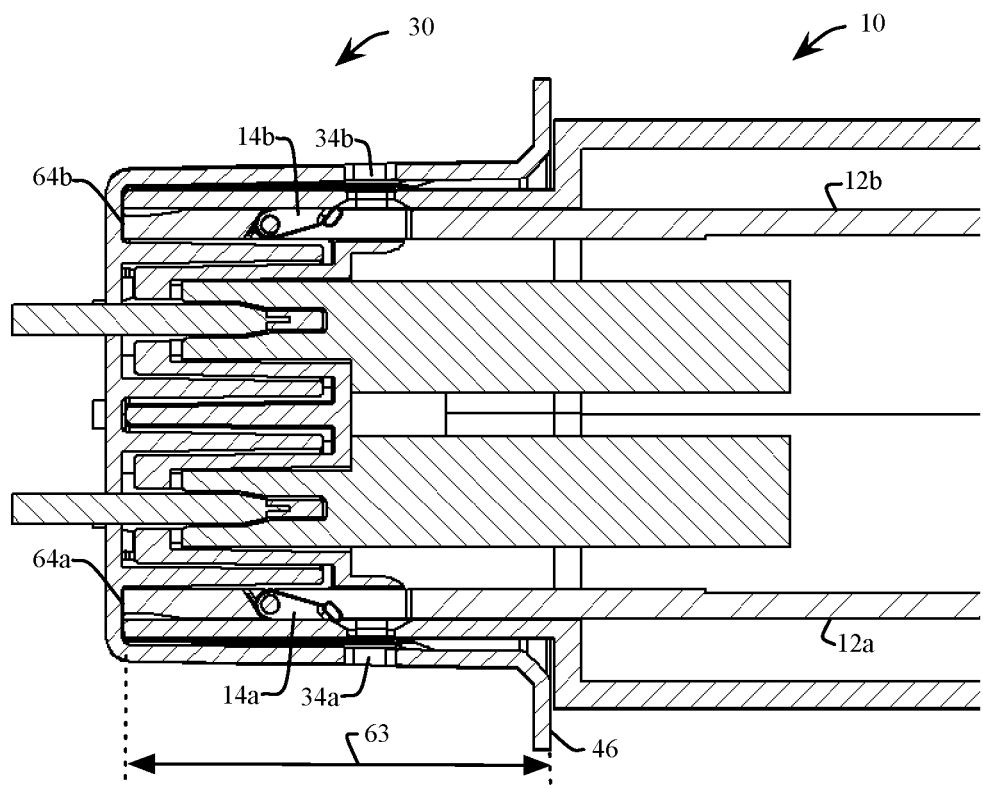
Figure 17:
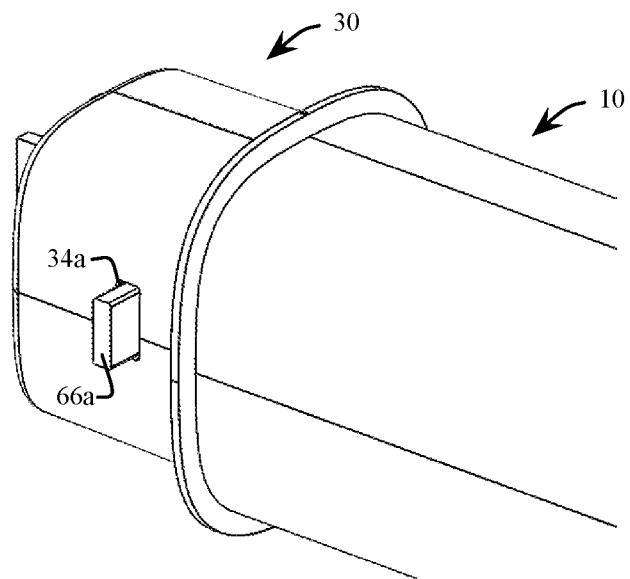
FIG. 17 and FIG. 18 are respective perspective and cross-sectional views of a latch pin inserted through the connector and inlet, in accordance with the first example embodiment of the present disclosure.
Figure 18:
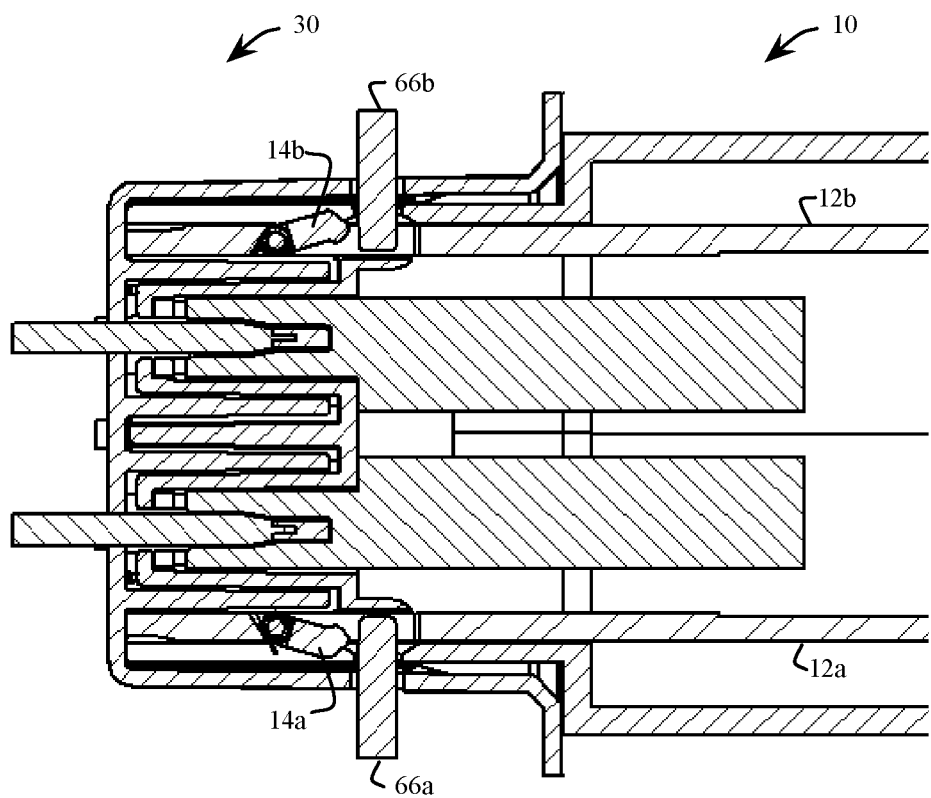

FIG. 15 and FIG. 16 show the latch pawls 14 removed from the recessed portions 34 by extending the puller arms 12 toward the back of the inlet by a third distance 63 measured from the second surface 46, and proximal to respective third surfaces 64a and 64b (generally 64). In so doing, the latch pawls are put in a "captured state" (see also FIG. 3). FIG. 17 and FIG. 18 show a respective latch pin 66a and 66b (generally 66) inserted through the recessed portion 34 of the inlet 30 and through the puller arm 12 of the connector 10, in accordance with an example embodiment. In another embodiment, the step of inserting the latch pins 66 is eliminated. In another embodiment, only one of the two latch pins 66 are used. During a charging operation, insertion of the latch pins 66 mechanically locks the connector 10 to the inlet 30 to prevent inadvertent decoupling of the connector 10 from the inlet 30. Decoupling of the connector 10 from the inlet 30 during charging may cause high current arcing, incomplete charging, and the like. Each latch pin 66 is configured to slide into and out of a recessed portion 34 of the inlet 30.

Figure 19:
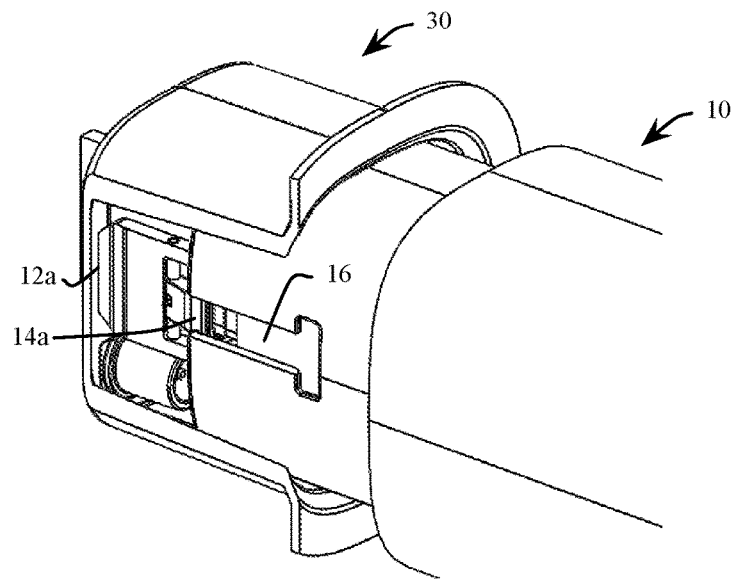
FIG. 19 and FIG. 20 are respective sectional-perspective and cross-sectional views of the connector disengaging from the inlet, in accordance with the first example embodiment of the present disclosure.
Figure 20:
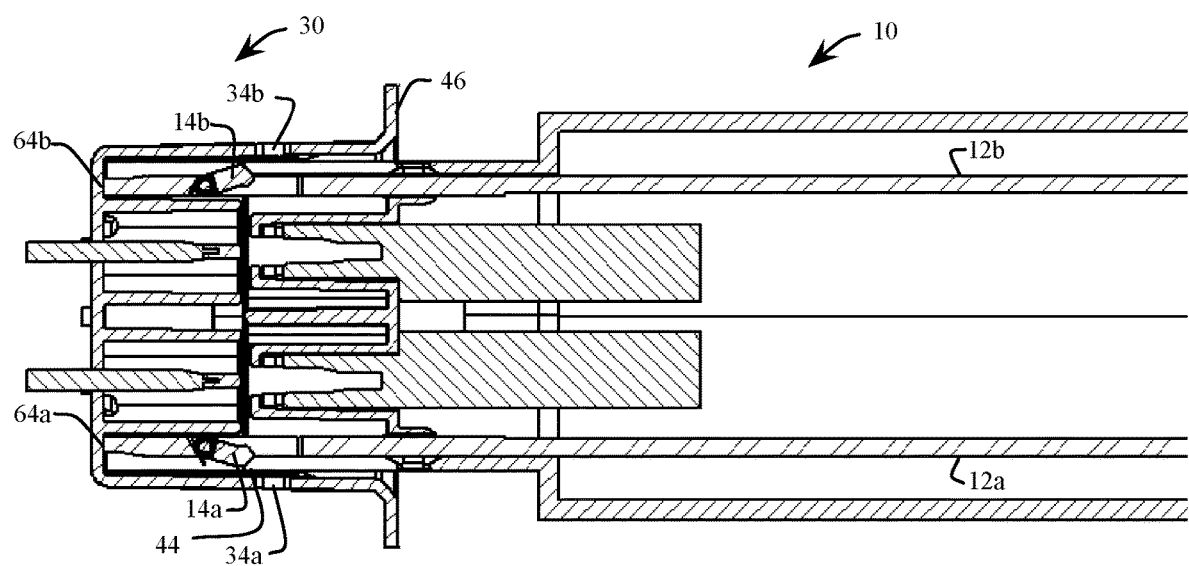

FIG. 19 and FIG. 20 show the connector 10 disengaging from the inlet 30 by further extending the puller arms 12 to apply a second compressive force against the respective third (inside) surfaces 64 of the inlet 30. The latch pawls 14 remain in the captured state (see also FIG. 3 and FIG. 4) while the puller arms 12 slide past the recessed portions 34, and the first surface 44 of the connector 10 and the second surface 46 of the inlet 30 separate.

Figure 21:
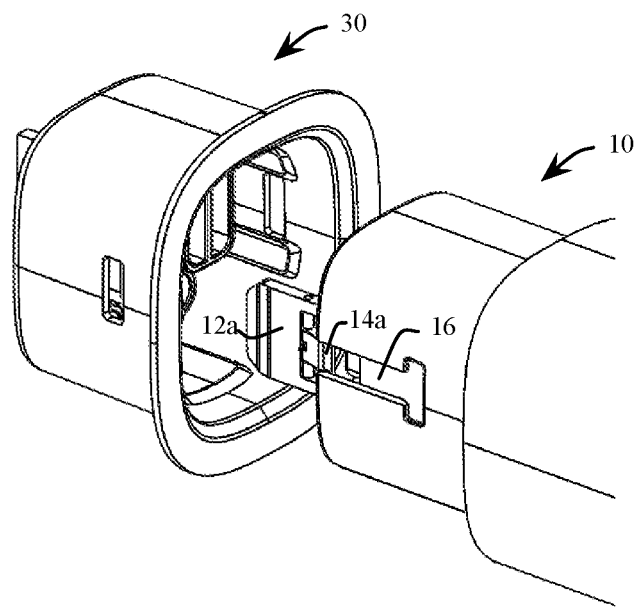
FIG. 21 and FIG. 22 are respective perspective and cross-sectional views of the connector with the connector retreating from the inlet, in accordance with the first example embodiment of the present disclosure.
Figure 22:
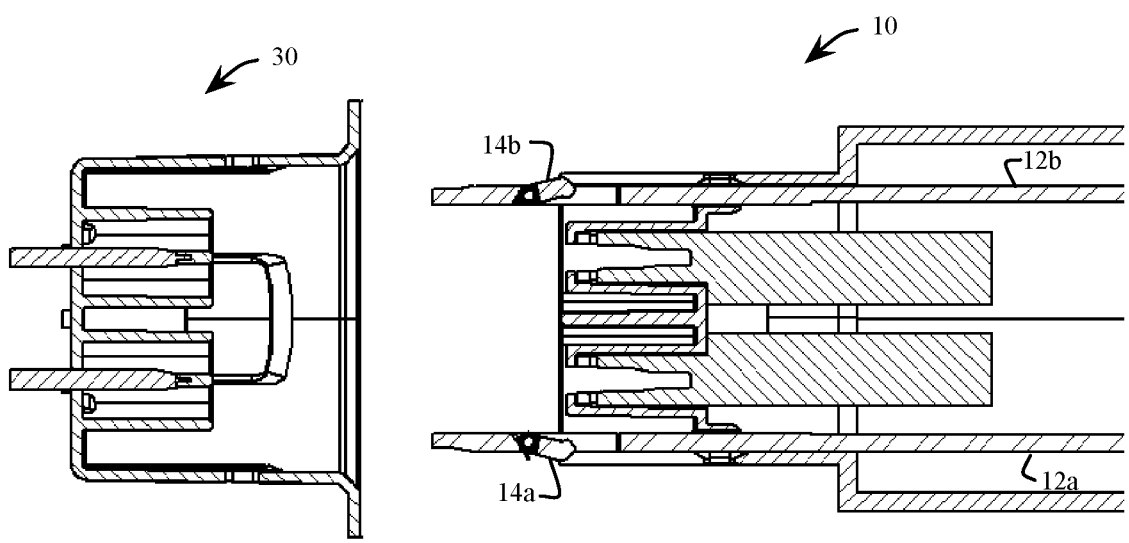
Figure 23:
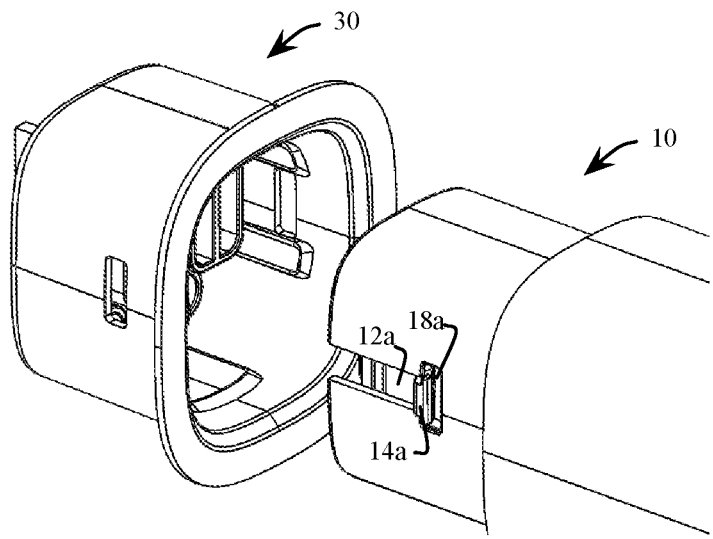
FIG. 23 and FIG. 24 are respective perspective and cross-sectional views of the latch pawls exiting the captured state after the connector retreats from the inlet, in accordance with the first example embodiment of the present disclosure.
Figure 24:
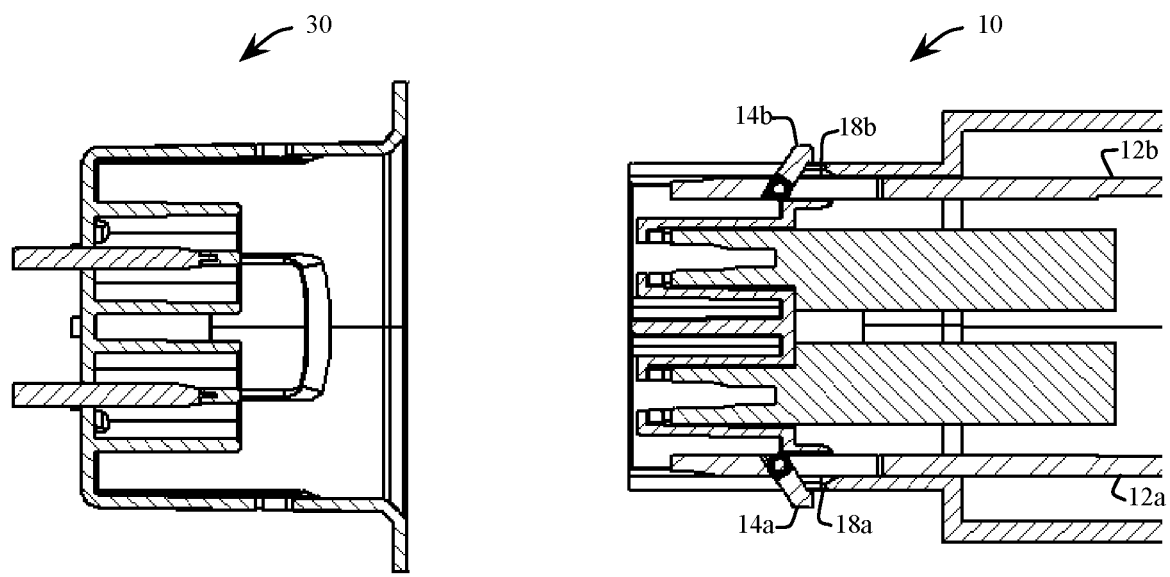

FIG. 21 and FIG. 22 show the connector 10 being fully removed or disengaged from the inlet 30, while the latch pawls 14 remain in the captured state, (see also FIG. 3). FIG. 23 and FIG. 24 show the latch pawls 14 exiting the captured state after the puller arms 12 are pulled further back into the connector 10 to align the latch pawls 14 with the respective second openings 18a and 18b (generally 18). This action puts the connector 10 in a reset state in preparation for a subsequent connection to an inlet (e.g., the inlet 30 or another inlet of another chargeable device).

Second Embodiment

Figure 25:
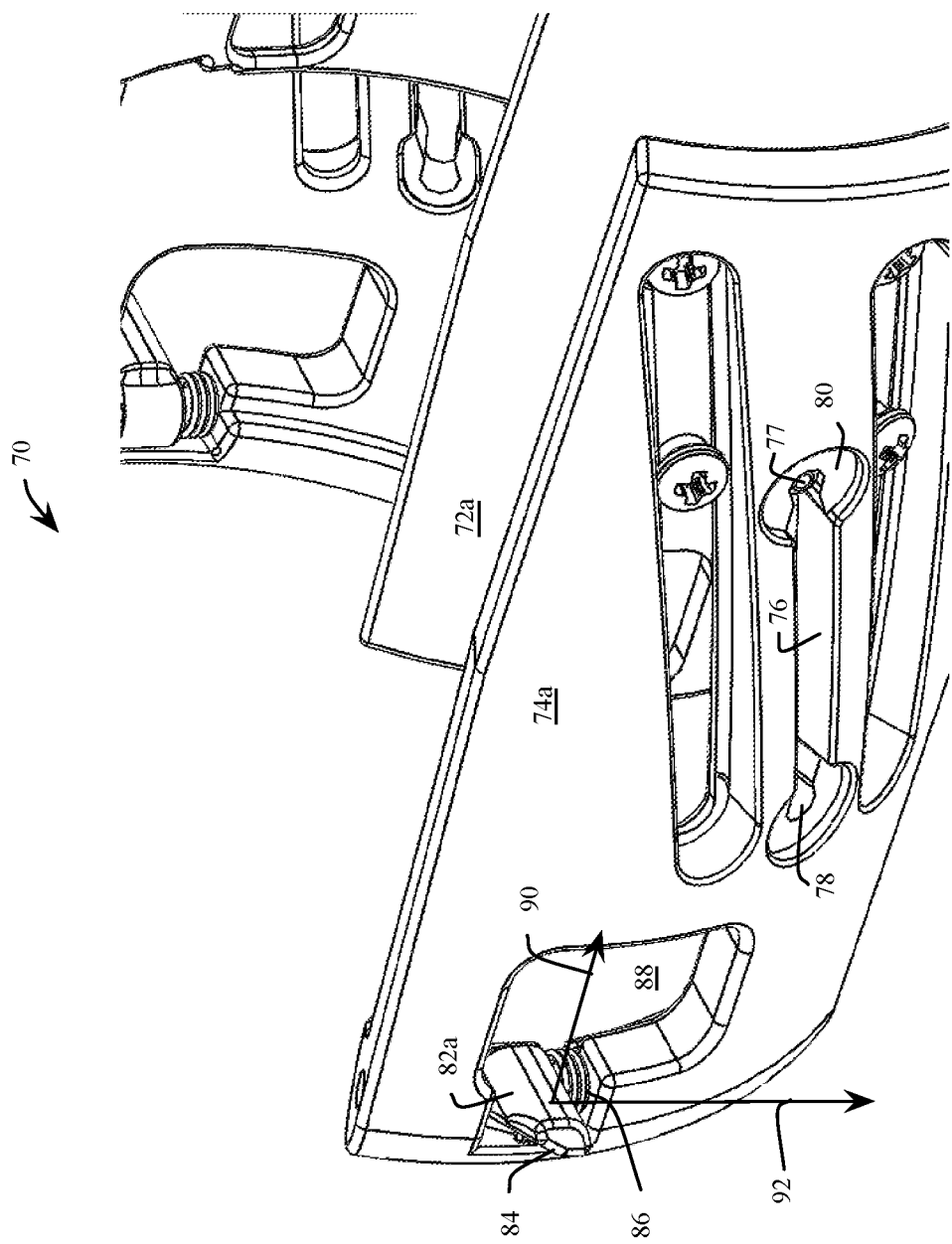
FIG. 25 is a perspective views of a second example embodiment of a connector with a latch pawl in an open position.

FIG. 25 shows an example embodiment of a connector 70 including a puller arm 72*a*. The puller arm 72*a* is coupled to a puller arm extender 74*a* along a helical path 76. A movement or range of the puller arm extender 74*a* along the helical path 76 is constrained by a limiting post 77 (e.g., a set screw, pin or other limiting device) coming into contact with a first stop 78 (e.g., a fixed wall, locking latch or other limiting device), and by a second stop 80. The first stop 78 and second stop 80 are attached to the puller arm extender 74*a* and are free to slide along the helical path 76 to translate a linear movement of the puller arm 72*a* into a rotational movement of the puller arm extender 74*a*. A latch pawl 82*a* (e.g., a gripping element) includes a chamfered edge 84 (or edges) and is configured to rotate outward (as shown in FIG. 25) from the latch pawl extender 74*a* by a torsional spring 86. In response to the translated rotational force applied to the puller arm extender 74*a*, the latch pawl 82*a* rotates into an opening 88. The chamfered edge 84 directs the rotational force primarily along a first force vector 90, rather than along a second force vector 92 to prevent binding of the latch pawl 82*a* against the puller arm extender 74*a*.

Figure 26:
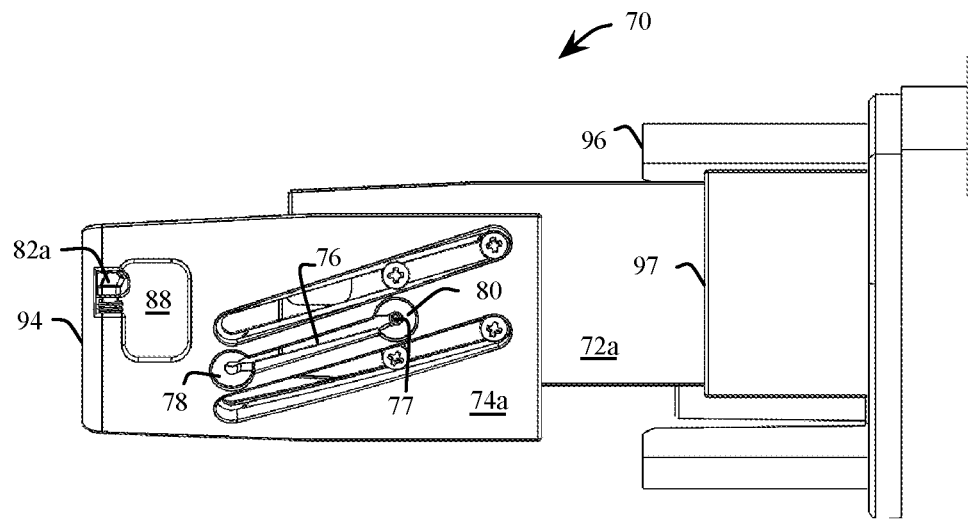
FIG. 26 and FIG. 27 are side views of the connector with a puller arm extender in an extended and retracted configuration respectively.
Figure 27:
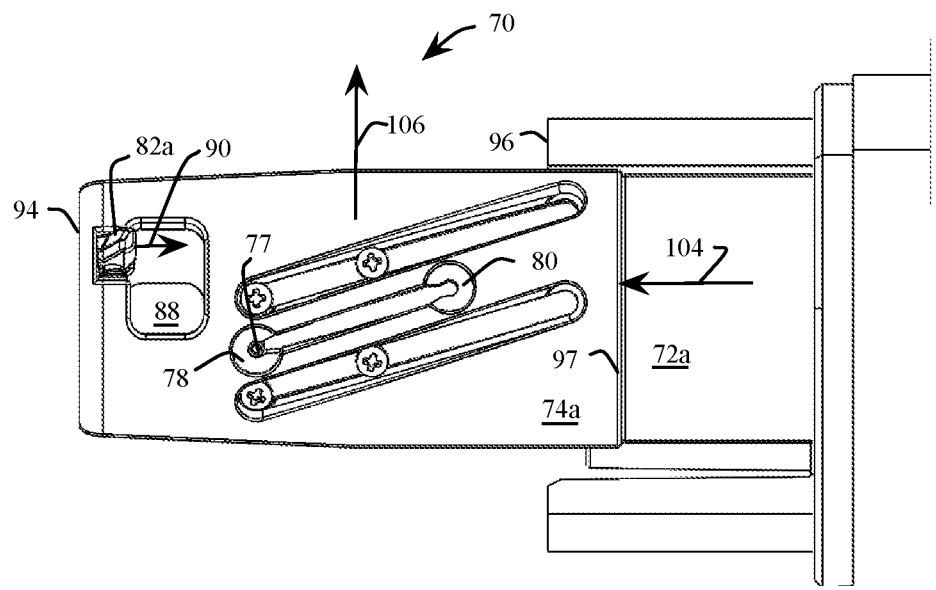

FIG. 26 and FIG. 27 show the connector 70 in an extended and retracted configuration respectively. In FIG. 26, a puller arm extender surface 94 is extended away from a first surface 97. Accordingly, the second stop 80 is against a limiting post 77. In FIG. 27, the first surface 97 is retracted towards the puller arm extender surface 94 by linearly moving the puller arm 72. Accordingly, the first stop 78 is against a limiting post 77. By linearly extending the puller arm 72 in an extend direction 104, an induced rotational direction 106 of the puller arm extender 74*a* causes the first force vector 90 to be applied to the latch pawl 82*a*, when the latch pawl 82*a* is pressed against the inside of an inlet, thereby causing the latch pawl 82*a* to rotate into the first opening 88.

Figure 28:
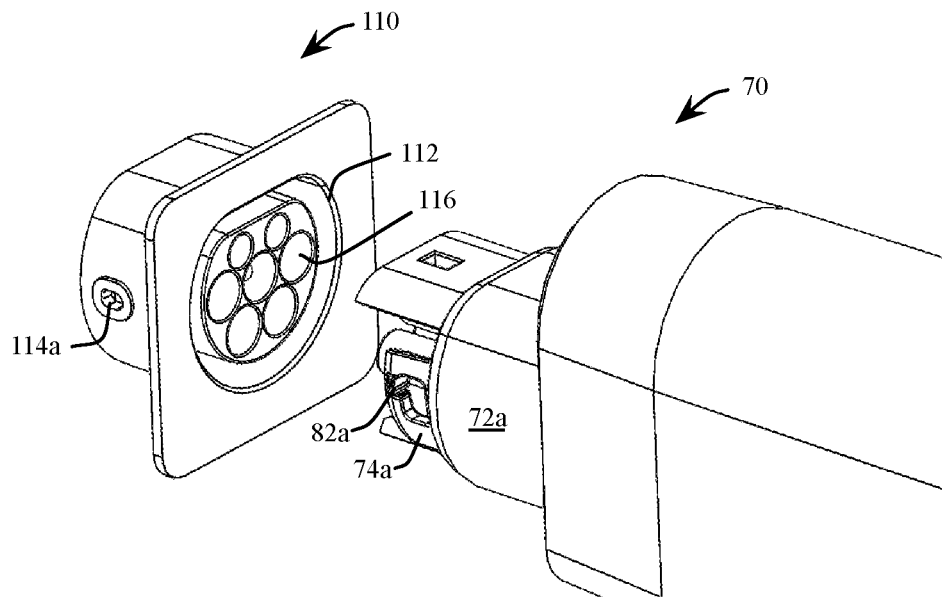
FIG. 28 and FIG. 29 are respective perspective and cross-sectional views of the connector approaching an inlet, in accordance with a second example embodiment of the present disclosure.

FIG. 28, with reference to FIG. 5, shows the connector 70 aligned with an example embodiment of an inlet 110. In one embodiment, the inlet 110 includes a chamfered edge 112 to facilitate the insertion of the connector 70 into the inlet 110. The inlet 110 includes a recessed portion 114*a* sized to receive the latch pawl 82*a* during a gripping step. In one embodiment, the recessed portion 114*a* is an opening through the inlet. In another embodiment, the recessed portion 114*a* is a recessed pocket on the inside of the inlet 110. The inlet further includes a second electrode 116. The example embodiment of the inlet 110 shows a Combined Charging System, Type 2 (CCS2) inlet, however other inlet designs are envisioned within the scope of this disclosure. The second electrode 116 of the inlet 110 is configured to have a cylindrical cross-section. Other embodiments of the inlet 110 include a variety of shapes, configured as either male or female electrodes designed to couple with a corresponding male or female electrode of the connector 70.

Figure 29:
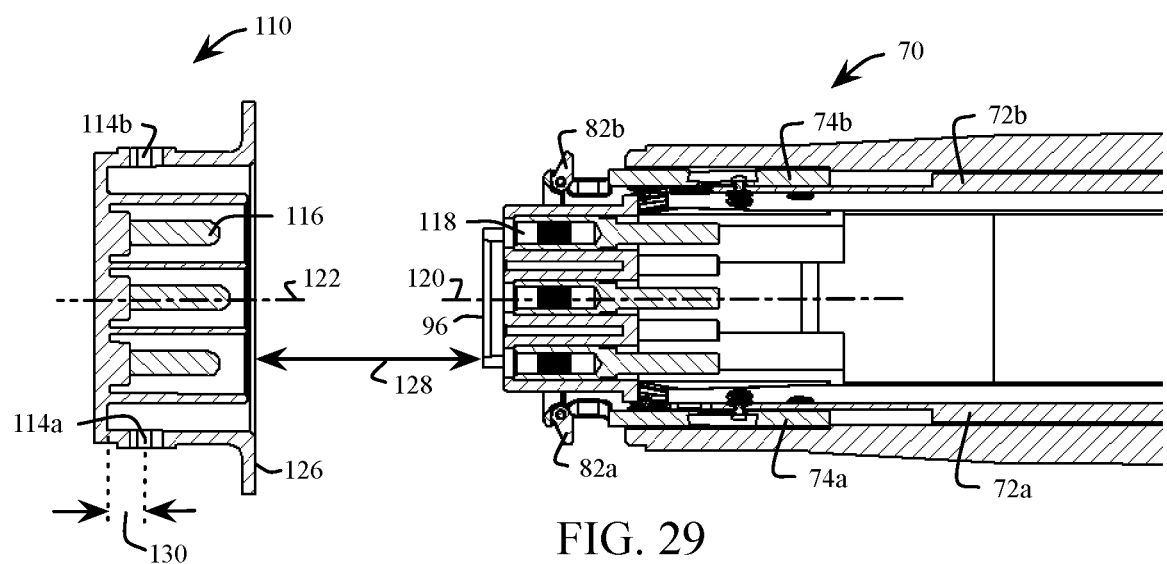

FIG. 29, with reference to FIG. 6, shows the connector 70 aligned for insertion into the inlet 110. The connector 70 includes a first colinear axis 120 substantially aligned to a second colinear axis 122 of the inlet 110. A first surface 96 of the connector 70 and a second surface 126 of the inlet 110 are within a first distance 128 (e.g., approximately 100 mm or less than 500 mm). The first surface 96 is substantially parallel to the second surface 126 and orthogonal to the first colinear axis 120. In other embodiments, the connector 70 and the inlet 110 are misaligned within typical manufacturing tolerances and environmental variations. FIG. 29 shows a pair of latch pawls 82*a* and 82*b* (generally 82) coupled to respective puller arm extenders 74*a* and 74*b* (generally 74). The puller arm extenders 74*a* and 74*b* and coupled to respective puller arms 72*a* and 72*b* (generally 72). The inlet 110 shows a pair of recessed portions 114*a* and 114*b* (generally 114) configured to receive corresponding latch pawls 82*a* and 82*b*. The connector 70 includes a first electrode 118 aligned to mate with a respective second electrode 116 of the inlet 110. In other embodiments, a different number of first and second electrodes are included from the example embodiment shown in FIG. 29, where only five electrodes are shown for clarity of exposition. In contrast to the first embodiment shown in FIG. 1 through FIG. 24, the second embodiment of FIG. 29 has a shorter distance 130 between the recessed portions 114 and an inside surface of the inlet 110, thus requiring the helical arrangement of the connector 70 to place the latch pawls 82 in a captured state.

Figure 30:
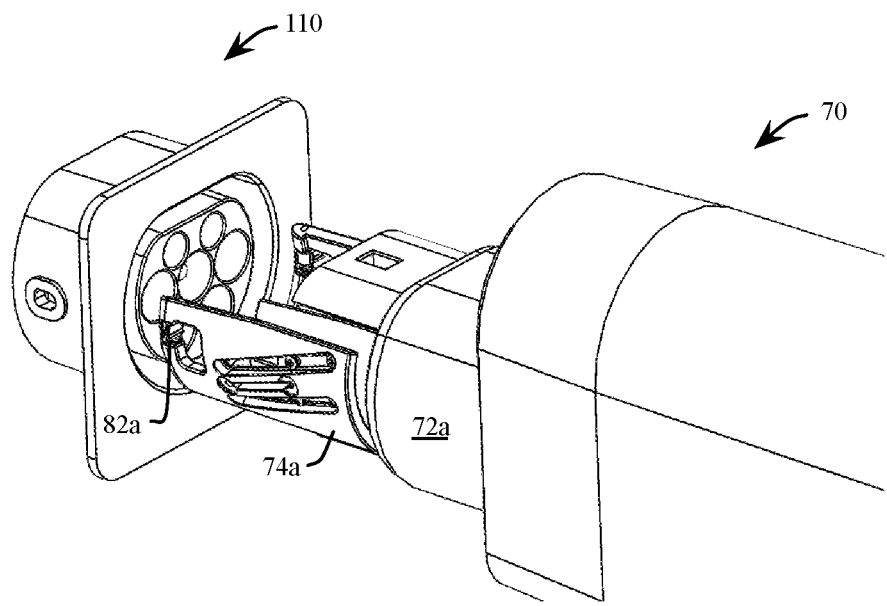
FIG. 30 and FIG. 31 are respective perspective and cross-sectional views of two puller arms of the connector extending towards the inlet, in accordance with a second example embodiment of the present disclosure.
Figure 31:
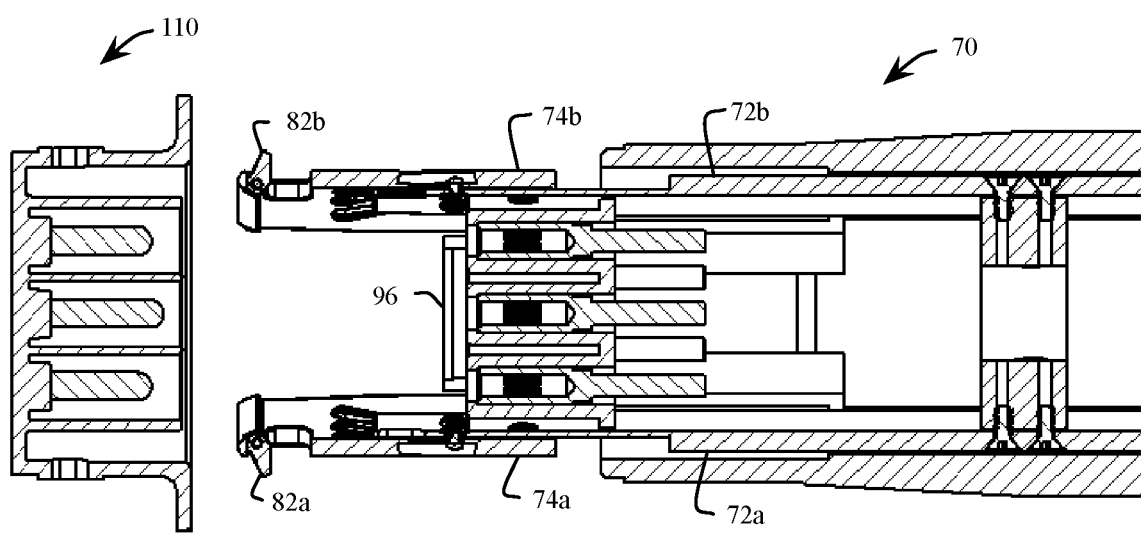
Figure 32:
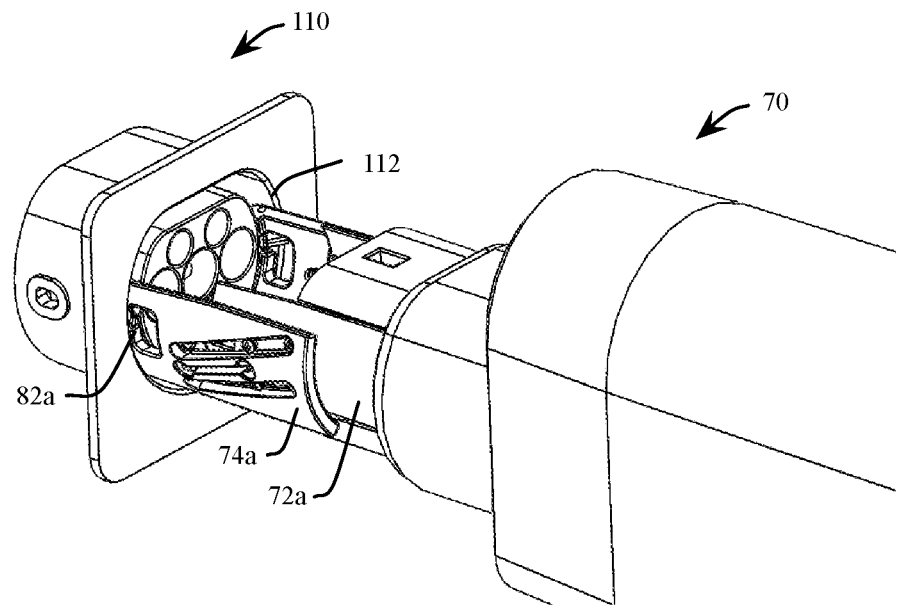
FIG. 32 and FIG. 33 are respective perspective and cross-sectional views of the puller arms making initial contact with the inlet, in accordance with a second example embodiment of the present disclosure.
Figure 33:
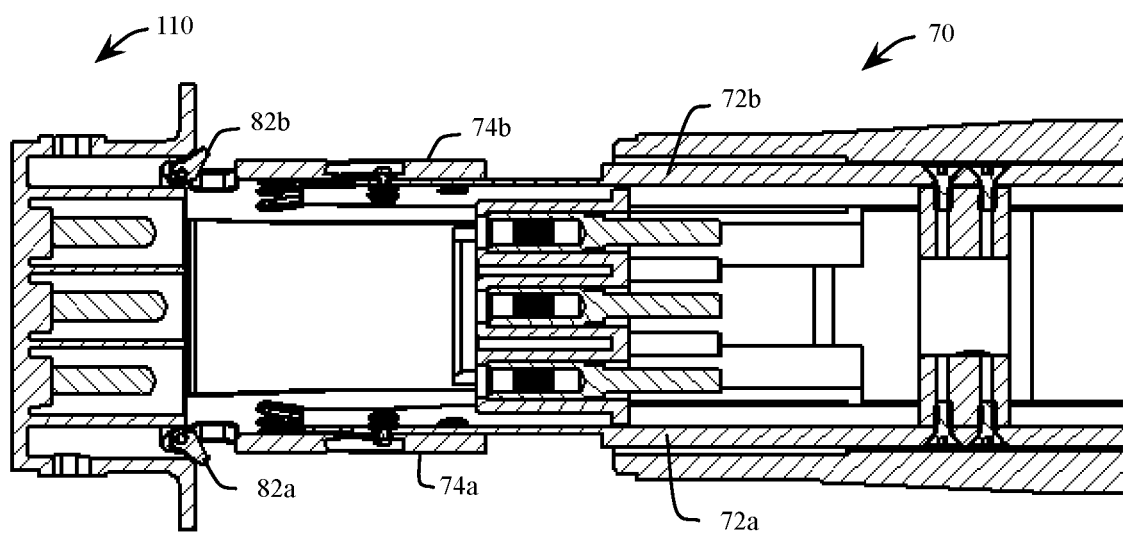

FIG. 30 and FIG. 31, with reference to FIG. 7 and FIG. 8, show the connector 70 with puller arms 72 extended towards the inlet 110, in preparation for engagement between the connector 70 and the inlet 110. In one example, the puller arms 72 are extended from a resting position of 0 mm, (referenced to a first surface 96 of the connector 70) to 100 mm. FIG. 32 and FIG. 33, with reference to FIG. 9 and FIG. 10, show the puller arms 72 making initial contact with the inlet 110 at a chamfered edge 112, by moving the connector 70 towards the inlet 110 with the puller arms extended as shown in FIG. 30 and FIG. 31.

Figure 34:
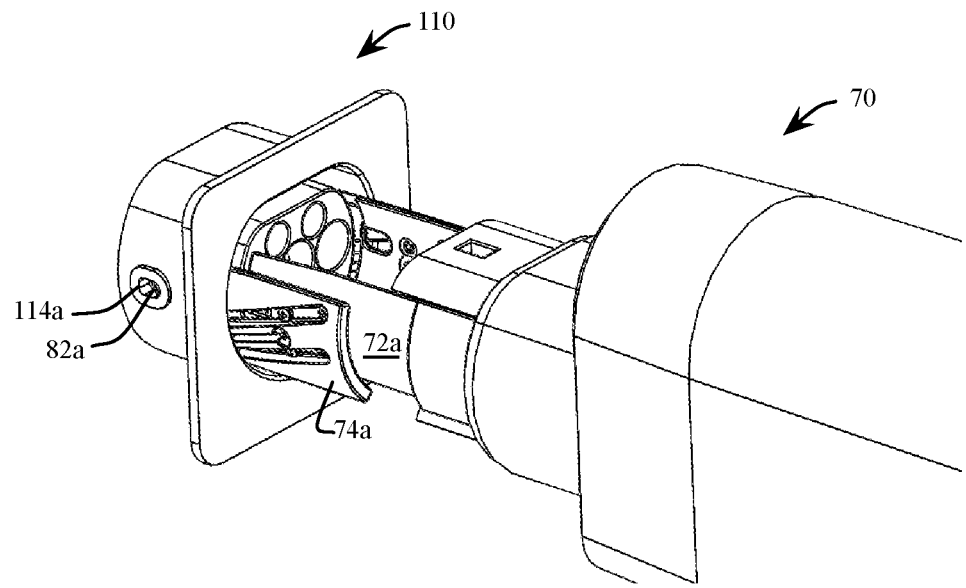
FIG. 34 and FIG. 35 are respective perspective and cross-sectional views of the puller arms engaging with a recessed portion of the inlet, in accordance with a second example embodiment of the present disclosure.
Figure 35:
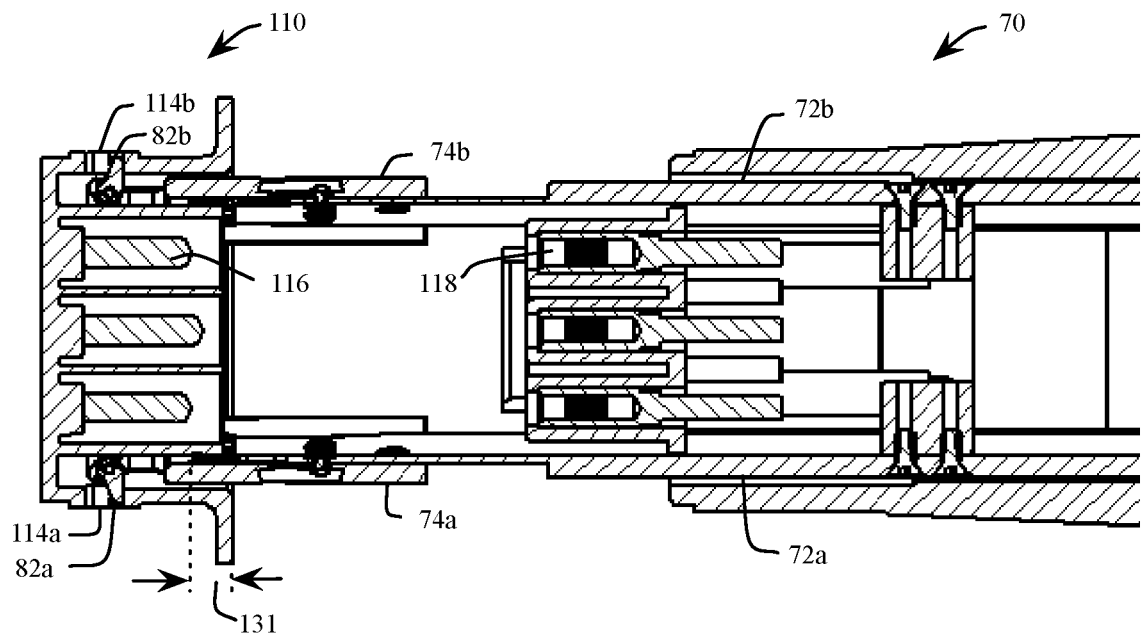
Figure 36:
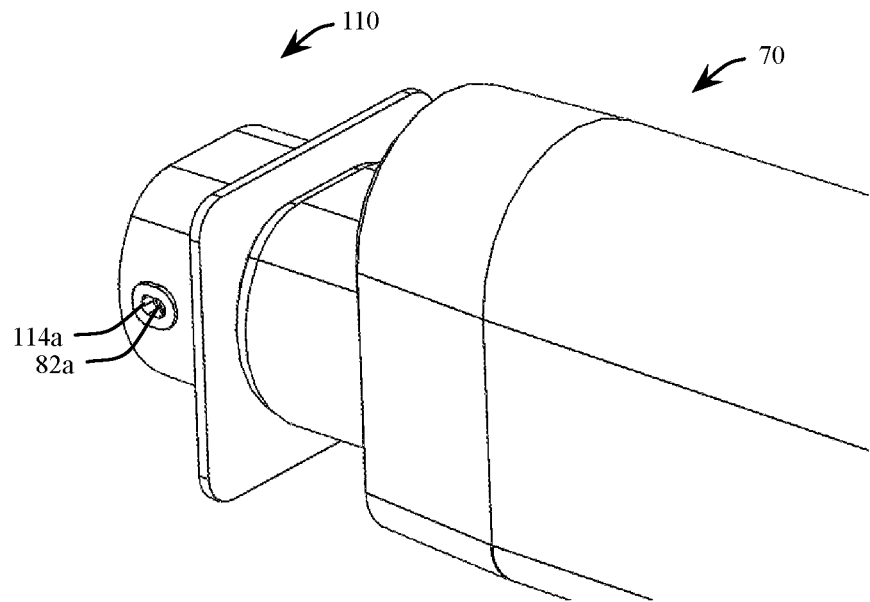
FIG. 36 and FIG. 37 are respective perspective and cross-sectional views of the connector pulled into the inlet by compressive force of the latch pawls, in accordance with a second example embodiment of the present disclosure.
Figure 37:
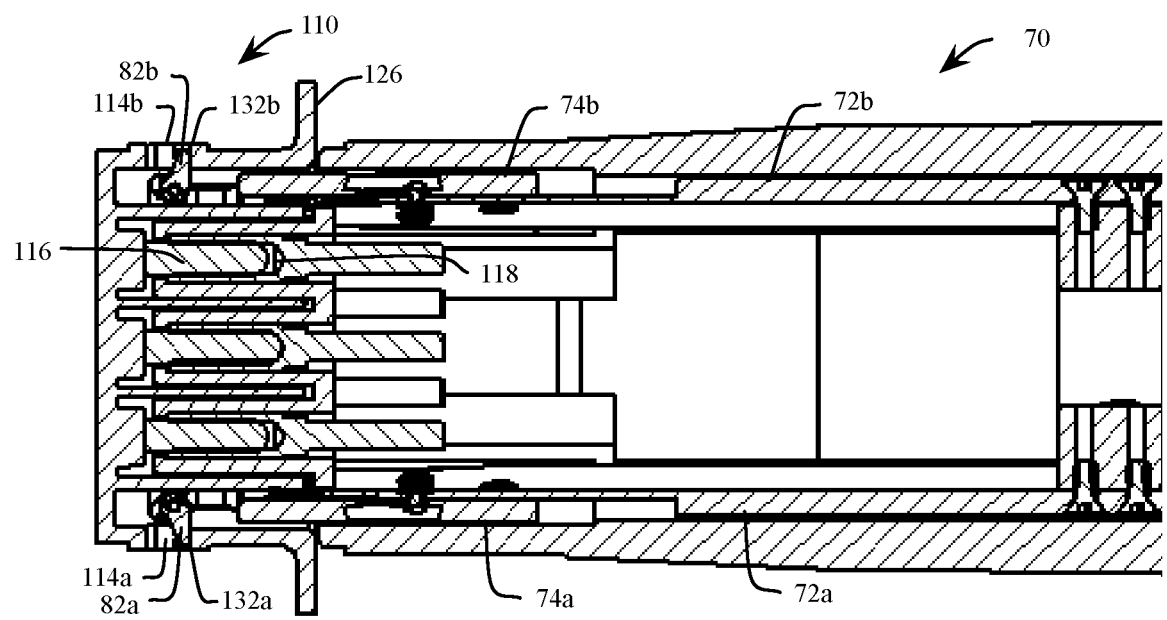

FIG. 34 and FIG. 35, with reference to FIG. 11 and FIG. 12 shows each puller arm 72 extended into the inlet 110 by a second distance 130 measured from the second surface 126 of the inlet 110. Accordingly, each latch pawl 82 is aligned with, and extends into, a respective recessed portion 114 due the force of the torsional spring 86 on each latch pawl 82. FIG. 36 and FIG. 37, with reference to FIG. 13 and FIG. 14, show the first electrode 118 of the connector 70 pulled into contact with the second electrode 116 of the inlet 110 by retracting the puller arms 72 into the connector 70, while applying a first compressive force on a surface 132*a* and 132*b* (generally 132) of the recessed portions 114. In one example embodiment, the first compressive force against the surfaces is equal to or greater than the force that the inlet 110 provides against the insertion of the connector 70. For example, electrode contact friction, manufacturing tolerances, corrosion, aging or gravity (e.g., from the weight of the connector 70 and related cabling) can provide resistance to the insertion of the connector 70 into the inlet 110. In one example embodiment, the high insertion and retraction force of coupling and decoupling the connector 70 with the inlet 110 is 10 lbs to 50 lbs. In one embodiment, the connector 70 is pulled into the inlet 110 until an insertion force of the first electrode 118 into the second electrode 116 exceeds a threshold.

Figure 38:
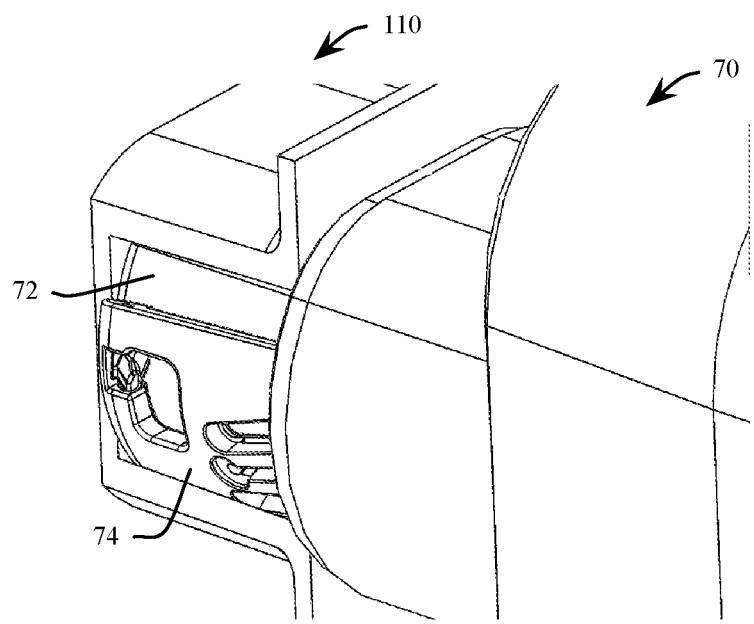
FIG. 38 and FIG. 39 are respective sectional-perspective and cross-sectional views of the puller arm extender extended fully into the inlet to facilitate capturing the latch pawls, in accordance with a second example embodiment of the present disclosure.
Figure 39:
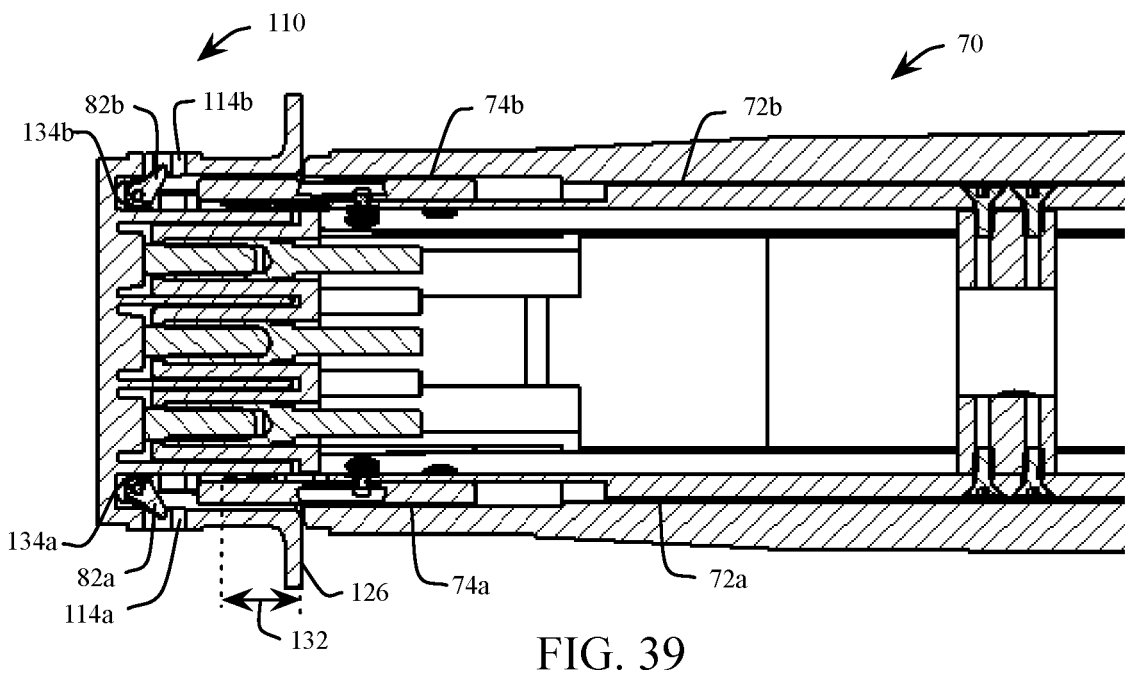

FIG. 38 and FIG. 39, with reference to FIG. 15 and FIG. 16, show the latch pawls 14 removed from the recessed portions 114 by extending the puller arms 72 toward the back of the inlet by a third distance 132 measured from the second surface 126, and proximal to respective third surfaces 134*a* and 134*b* (generally 134). In so doing, the latch pawls are put in a position to be placed in the captured state but due to the limited spacing between the recessed portions 114 and the third surface 134 (see also spacing 130 of FIG. 29), the latch pawls 82 must be rotated away from the recessed portions 114.

Figure 40:
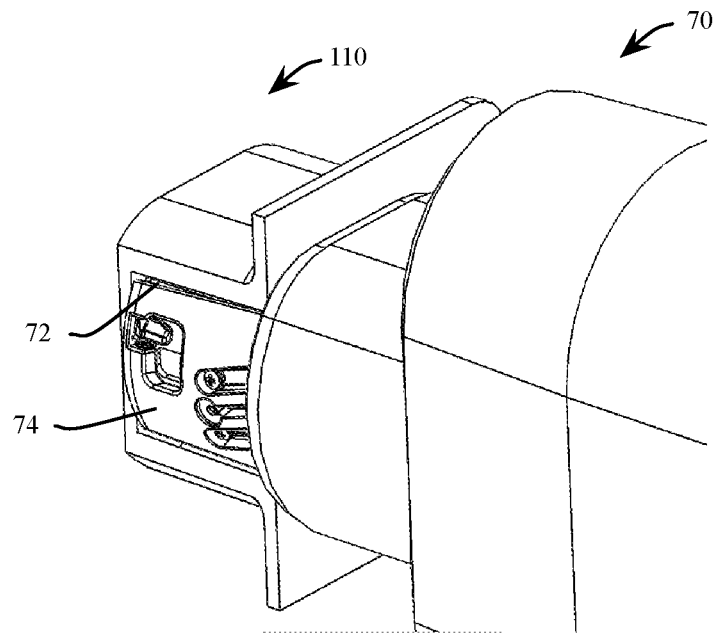
FIG. 40 and FIG. 41 are respective sectional-perspective and cross-sectional views of the latch pawls in a captured state inside the inlet, in accordance with a second example embodiment of the present disclosure.
Figure 41:
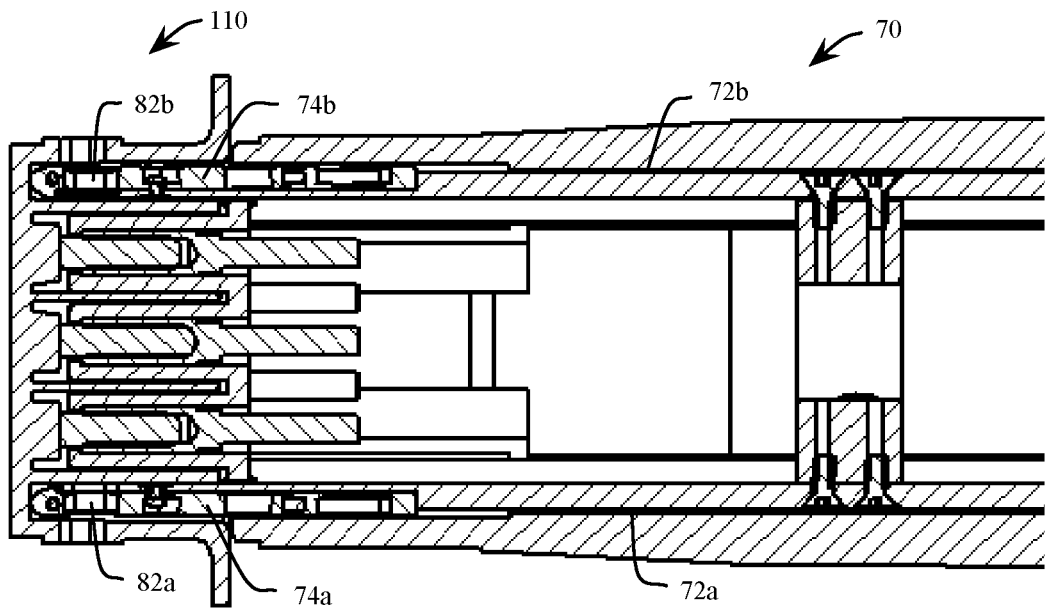

FIG. 40 and FIG. 41, with reference to FIG. 26 and FIG. 27 show the latch pawls 82 in the captured state. Specifically, the linear motion of the puller arm 72 in the extend direction 104 (see FIG. 27), causes the puller arm extender 74, and therefore the attached latch pawls 82, to rotate away from the recessed portions 114. This rotation of the puller arm extender 74 is further illustrated by comparing FIG. 38 to FIG. 40.

With reference to FIG. 17 to FIG. 24, the steps for inserting the latch pin, disengaging the connector 70 from the inlet 110, fully removing the connector 70 from the inlet 110 and putting the connector 70 in a reset state in preparation for a subsequent connection to an inlet, are also applicable to the second embodiment described in FIG. 25 to FIG. 41, thus for brevity and clarity are not repeated herein.

Third Embodiment

Figure 42:
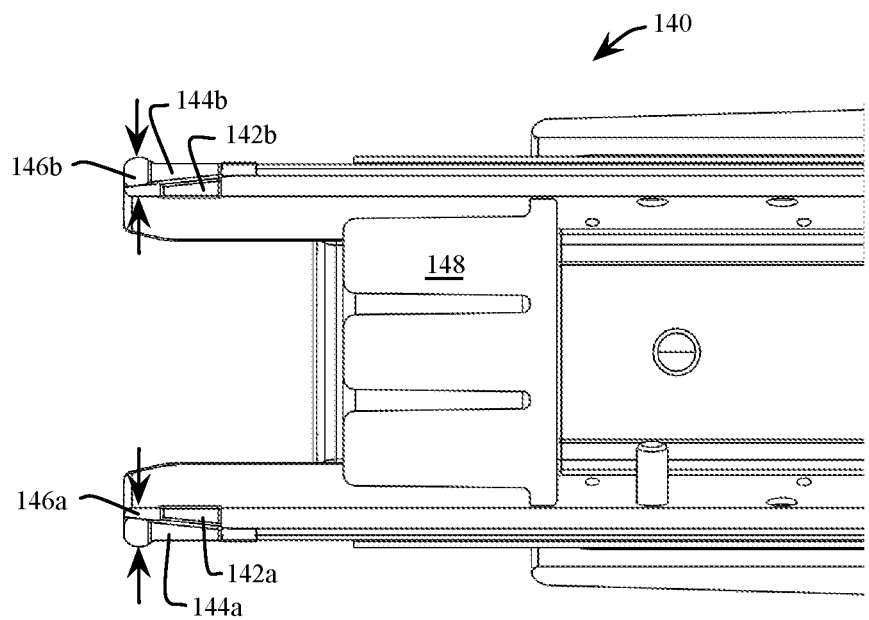
FIG. 42 and FIG. 43 are cross-sectional views of a third example embodiment of a connector with a puller arm in a narrow state and wide state respectively, in accordance with a third example embodiment of the present disclosure.
Figure 43:
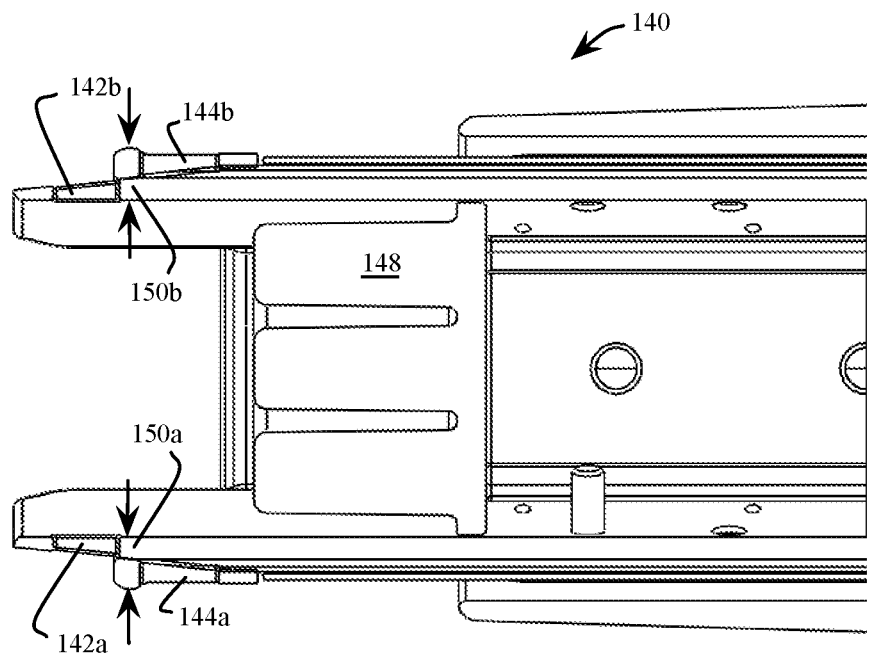

FIG. 42 and FIG. 43 show an example embodiment of a connector 140 including puller arms 142a and 142b (generally 142) having an angled surface. A corresponding pair of second puller arms (e.g., gripping element) 144a and 144b (generally 144) are configured to slide linearly along the angled surface of the puller arms 142 to change a combined width of the puller arms 142 and second puller arms 144. Specifically as shown in FIG. 42, when the puller arms 142 and second puller arms 144 are arranged with ends substantially aligned, the combined width is a respective narrow width 146a and 146b (generally 146). In contrast, when the puller arms 142 and second puller arms 144 are arranged with ends misaligned, the combined width is a respective wide width 150a and 150b (generally 150). Similar to the first embodiment of FIG. 6 and the second embodiment of FIG. 29, the example embodiment of the connector 140 includes at least one first electrode 148 and a corresponding second electrode 116 of an inlet. In other embodiments, a different number of second electrodes are included from the example embodiment shown in FIG. 42 and FIG. 43, where only a single electrode is shown for clarity of exposition.

Figure 44:
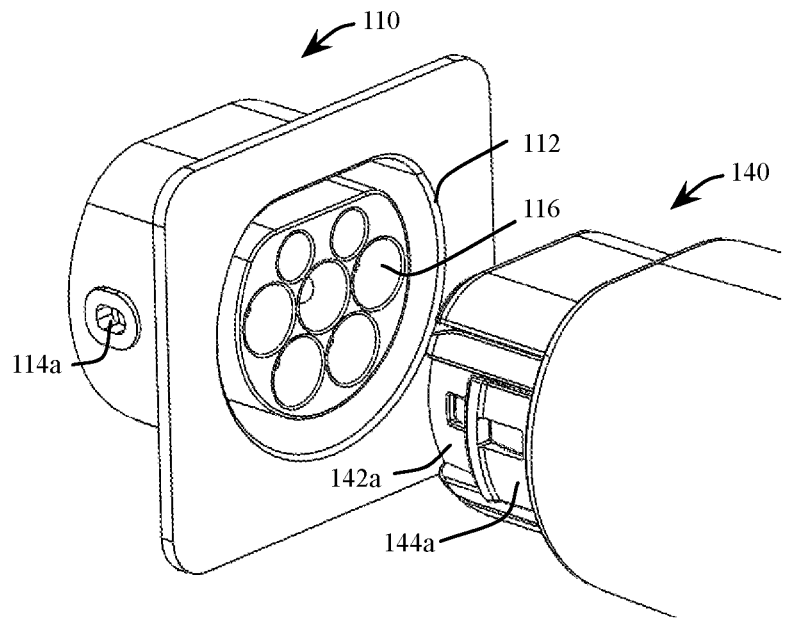
FIG. 44 and FIG. 45 are respective perspective and cross-sectional views of the connector approaching an inlet, in accordance with the third example embodiment of the present disclosure.
Figure 45:
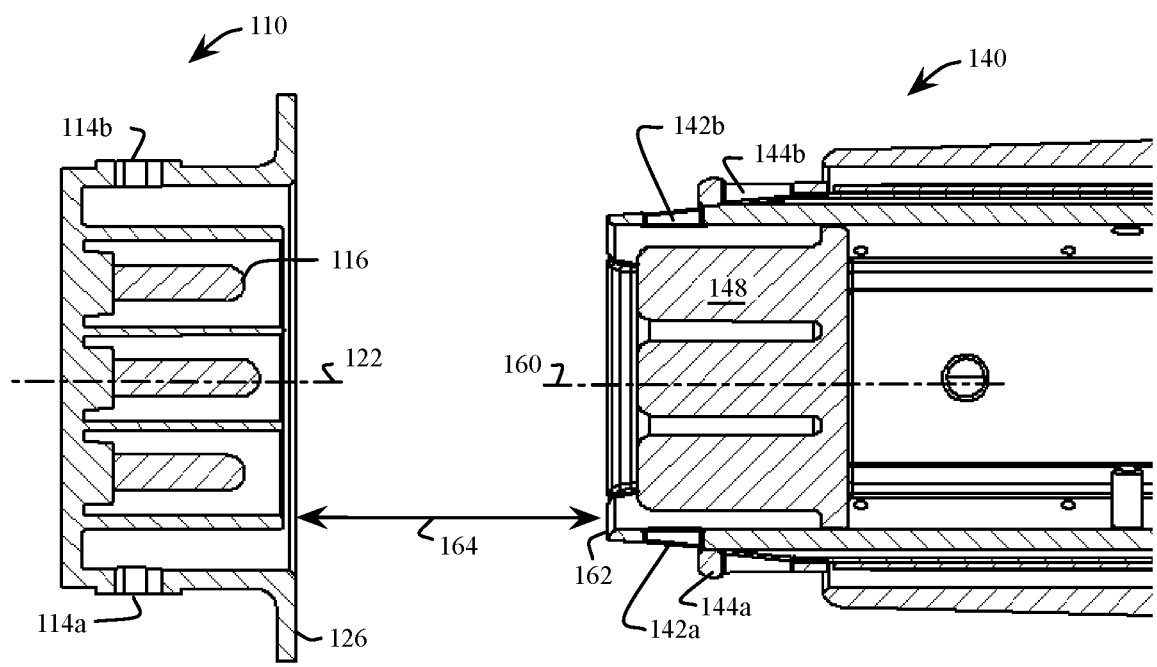

FIG. 44 and FIG. 45 show the connector 140 aligned for insertion into an example embodiment of an inlet 110, with the connector in the wide configuration, as shown in FIG. 43. The example embodiment of the inlet 110 shows a Combined Charging System, Type 2 (CCS2) inlet as used by the second embodiment described in FIG. 25 to FIG. 41, however other inlet designs are envisioned within the scope of this disclosure. The connector 140 includes a first colinear axis 160 substantially aligned to a second colinear axis 122 of the inlet 110. A first surface 162 of the connector 140 and a second surface 126 of the inlet 110 are within a first distance 164 (e.g., approximately 100 mm or less than 500 mm). The first surface 162 is substantially parallel to the second surface 126 and orthogonal to the first colinear axis 160. In other embodiments, the connector 140 and the inlet 110 are misaligned within typical manufacturing tolerances and environmental variations.

In contrast to the first embodiment shown in FIG. 1 through FIG. 24, and the second embodiment shown in FIG. 25 to FIG. 41, the third embodiment does not rely upon the recessed portions 114 for gripping with the gripping element. Instead, gripping is performed by compressive force and resulting frictional forces on the inside of the inlet 110 when switching from the narrow configuration of FIG. 42 to the wide configuration of FIG. 43, thus creating a basis for the resulting frictional forces between the materials that the inlet and gripping mechanism are constructed from, to oppose and overcome the insertion forces of the connector/inlet interface.

Figure 46:
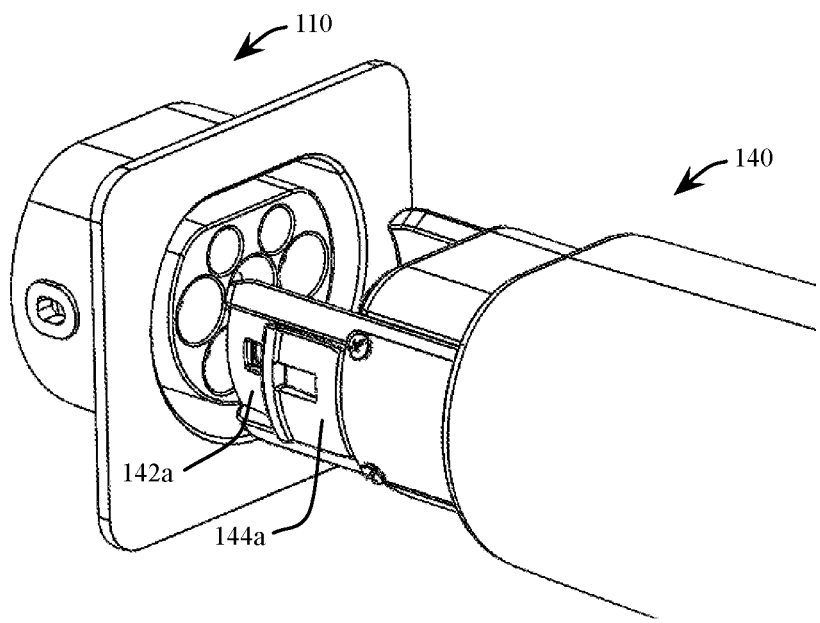
FIG. 46 and FIG. 47 are respective perspective and cross-sectional views of the puller arms in a wide state extended towards the inlet, in accordance with a third example embodiment of the present disclosure.
Figure 47:
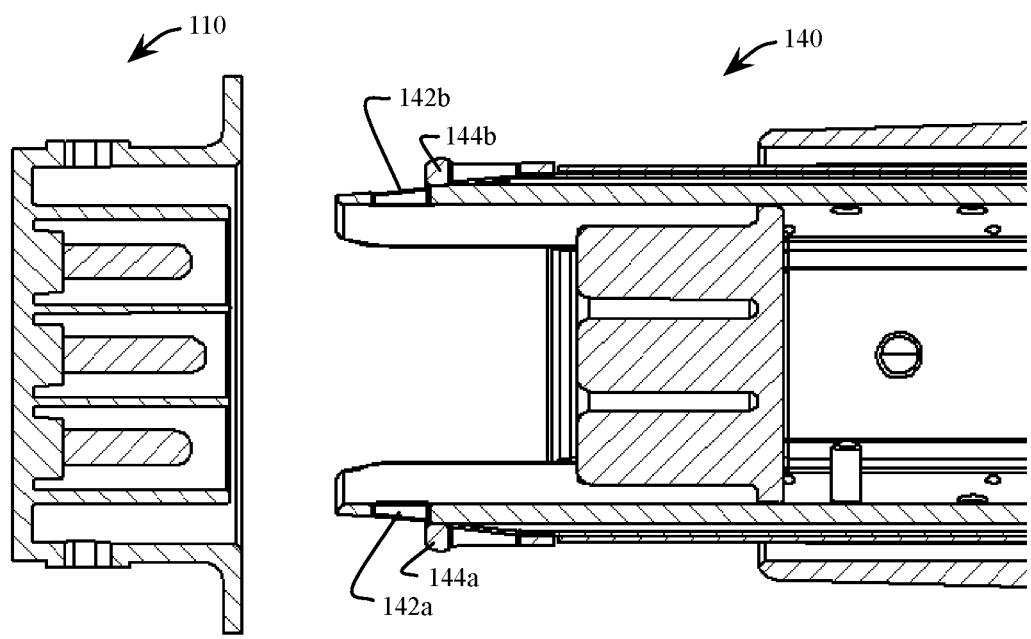
Figure 48:
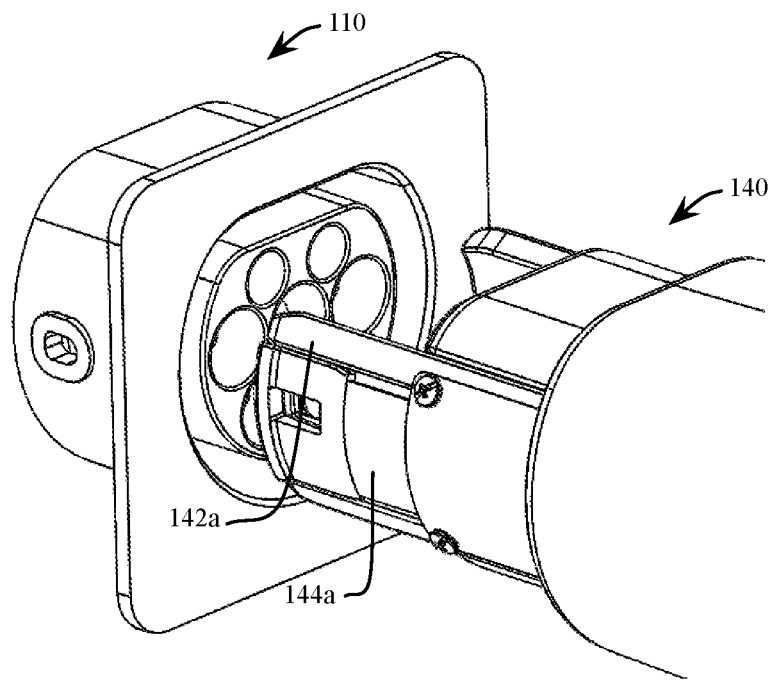
FIG. 48 and FIG. 49 are respective perspective and cross-sectional views of the puller arms in a narrow state extended towards the inlet, in accordance with a third example embodiment of the present disclosure.
Figure 49:
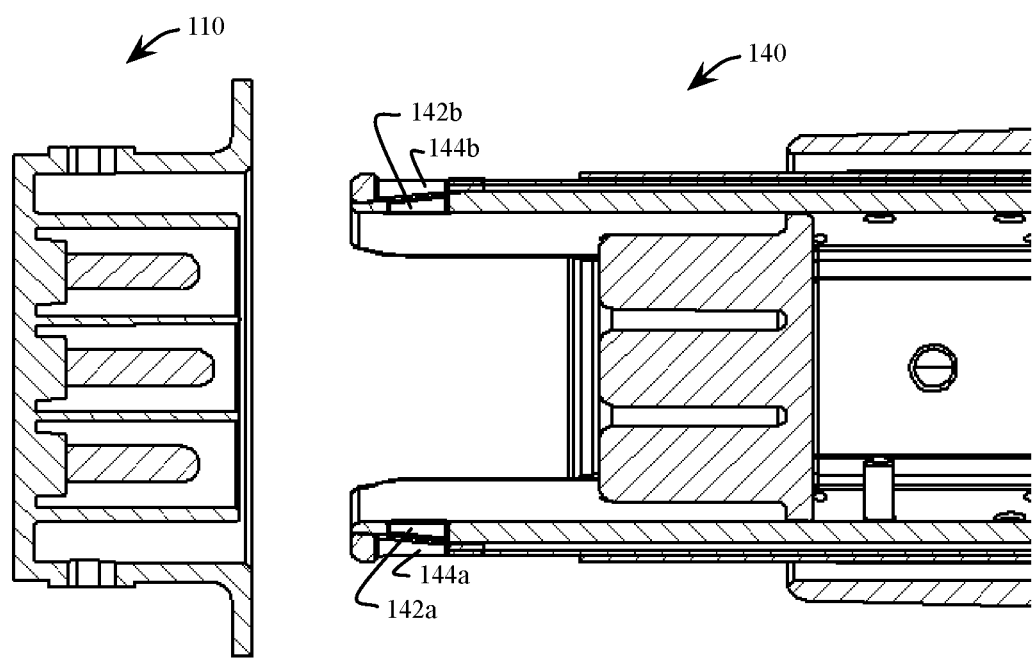

FIG. 46 and FIG. 47 show the connector 140 with the puller arms 142 extended towards the inlet 110, in preparation for engagement between the connector 140 and the inlet 110. In one example, the puller arms 142 are extended from a resting position of 0 mm, (referenced to the first surface 162 of the connector 140) to 100 mm. FIG. 48 and FIG. 49 show the connector 140 transitioned to the narrow configuration of FIG. 42, in preparation of inserting the connector 140 into the inlet 110.

Figure 50:
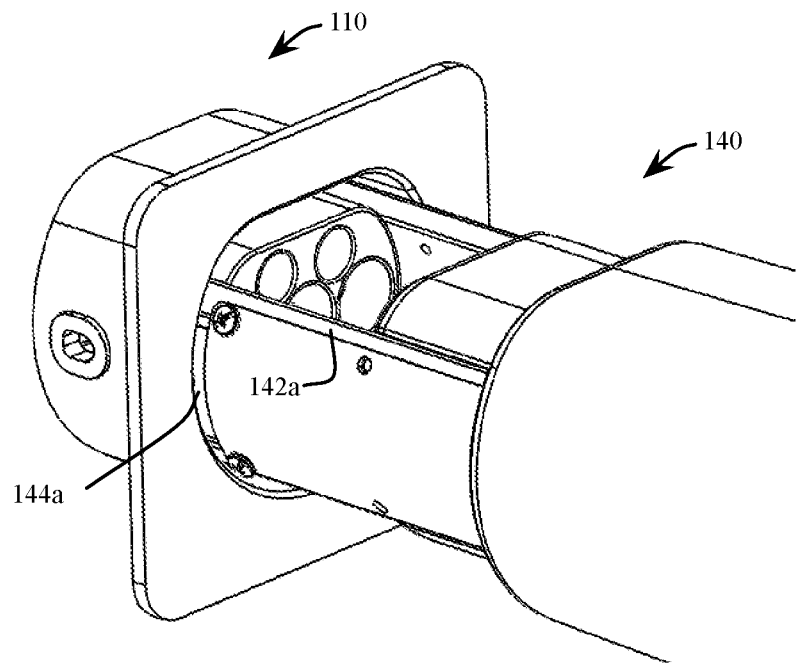
FIG. 50 and FIG. 51 are respective perspective and cross-sectional views of the puller arms extended into the inlet, in accordance with a third example embodiment of the present disclosure.
Figure 51:
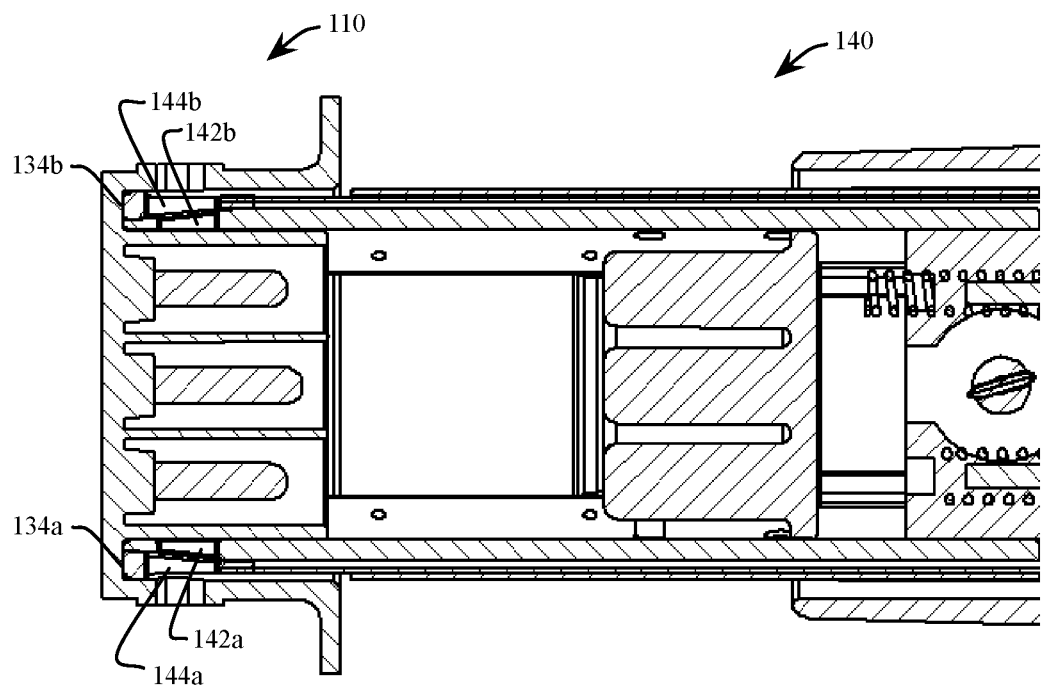
Figure 52:
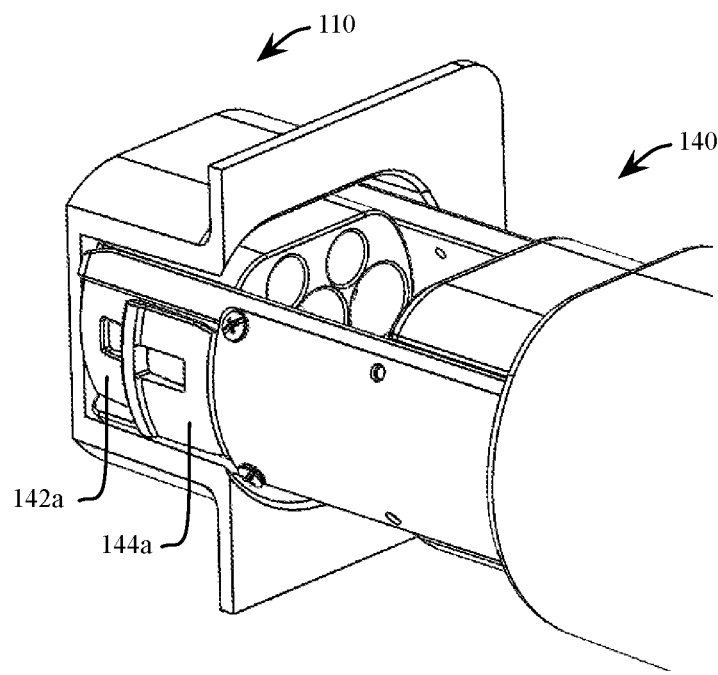
FIG. 52 and FIG. 53 are respective sectional-perspective and cross-sectional views of the puller arms in a wide state and engaging against the inlet, in accordance with a third example embodiment of the present disclosure.
Figure 53:
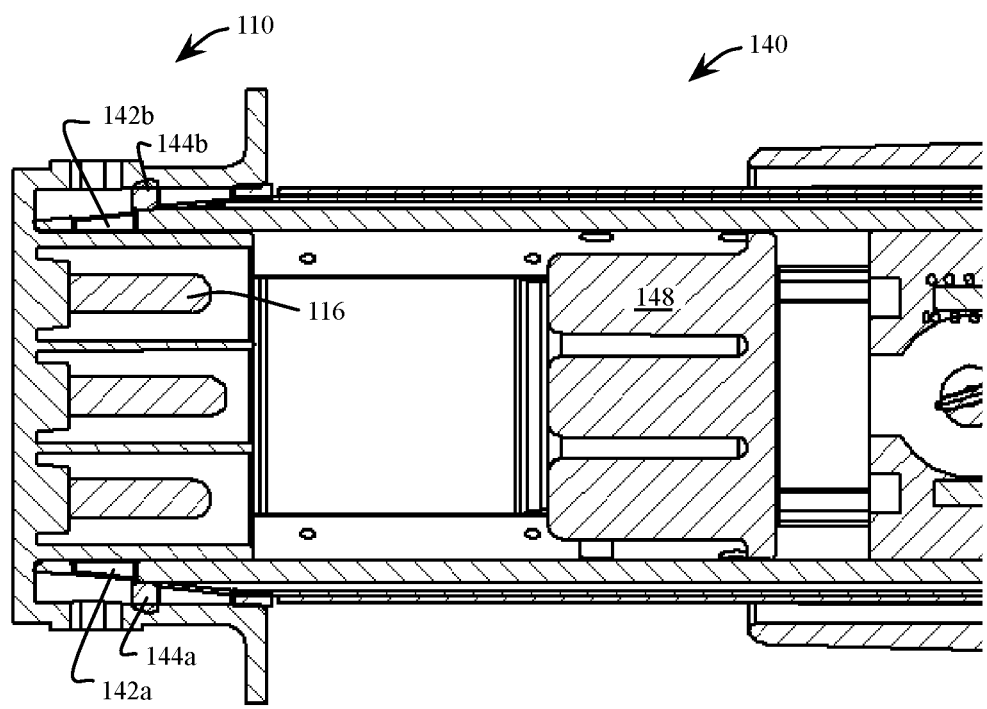
Figure 54:
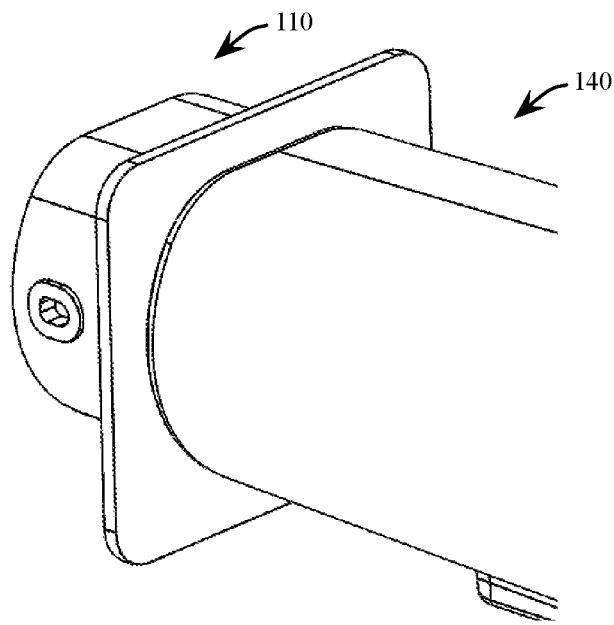
FIG. 54 and FIG. 55 are respective perspective and cross-sectional views of connector pulled into the inlet by compressive force of the puller arms against the inlet, in accordance with a third example embodiment of the present disclosure.
Figure 55:
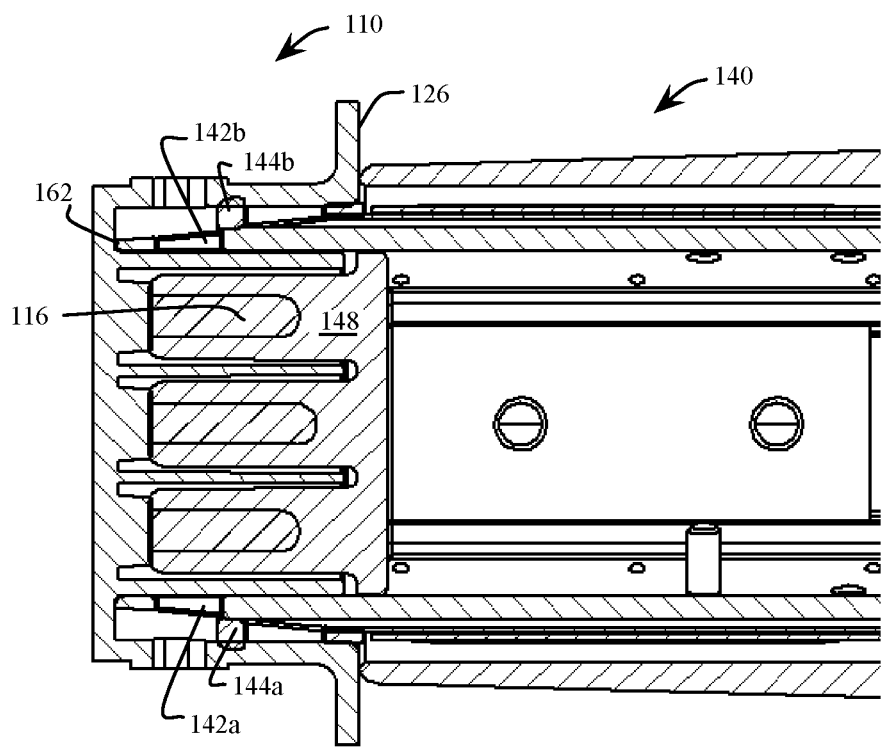

FIG. 50 and FIG. 51 show the puller arms 142 and the second puller arms 144 arranged to put the connector 140 in the narrow configuration of FIG. 42, and fully extended into the inlet 110, to contact the respective third surfaces 134a and 134b (generally 134). FIG. 52 and FIG. 53 show the second puller arms 144 retracted to configure the connector 140 in the wide configuration of FIG. 43, thereby gripping the inside of the inlet 110 and providing a basis for the resultant frictional gripping action between the inlet & puller arms. The frictional interface fulfils the same function in other embodiments as the direct application of force by the pawl mechanism. With reference to FIG. 54 and FIG. 55, by retracting the puller arms 142 (simultaneously doing so with the second puller arms 144), while the connector 140 is in the wide configuration of FIG. 43, the first electrode 148 of the connector 140 is pulled into contact with the second electrode 116 of the inlet.

In one example embodiment, the first compressive force against the inside of the inlet 110 is equal to or greater than the force that the inlet 110 provides against the insertion of the connector 140. For example, electrode contact friction, manufacturing tolerances, corrosion, aging or gravity (e.g., from the weight of the connector 10 and related cabling) can provide resistance to the insertion of the connector 140 into the inlet 110. In one example embodiment, the high insertion and retraction force of coupling and decoupling the connector 140 with the inlet 110 is 10 lbs to 50 lbs. In one embodiment, the connector 140 is pulled into the inlet 110 until an insertion force of the first electrode 148 into the second electrodes 116 exceeds a threshold.

With reference to FIG. 17 to FIG. 24, the steps for inserting the latch pin, disengaging the connector 140 from the inlet 110, (after putting the connector 140 in the narrow configuration), fully removing the connector 140 from the inlet 110 and putting the connector 140 in a reset state (e.g., the connector 140 is put in the wide configuration), in preparation for a subsequent connection to an inlet, are also applicable to the third embodiment described in FIG. 42 to FIG. 55, thus for brevity and clarity are not repeated herein.

Figure 56:
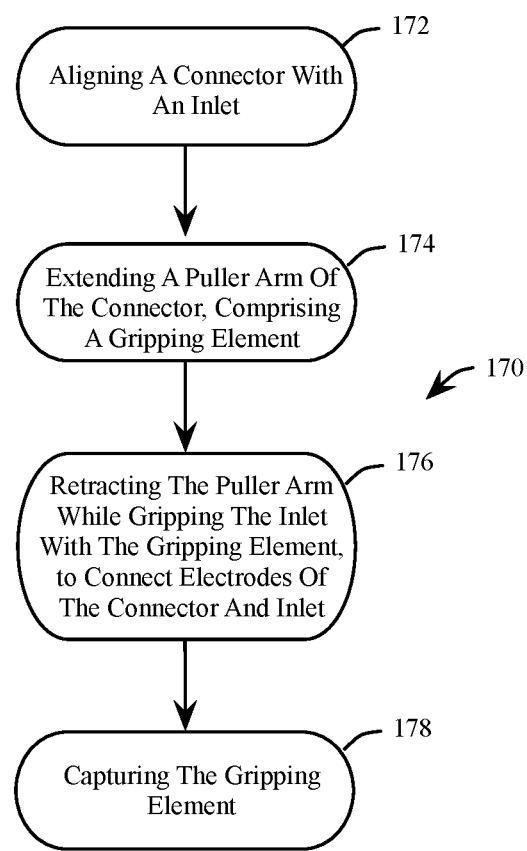
FIG. 56 is a flowchart representation of a method for latching an electrical connector, in accordance with an example embodiment of the present disclosure.

FIG. 56 shows an example embodiment of a method 170 for latching an electrical connector. At 172, a connector (10, 70 or 140) is aligned with an inlet (30 or 110). At 174, a puller arm (12, 72 or 142) of the connector is extended, wherein the puller arm comprises a gripping element (latch pawl 14 or 82; or conversion between narrow and wide configurations of FIG. 42 and FIG. 43 respectively). At 176, the puller arm is retracted while gripping the inlet with the gripping element, to connect electrodes of the connector and inlet (electrodes 36 to 50, 116 to 118, or 116 to 148). At 178, the gripping element is captured (FIG. 16, FIG. 41, or use of the narrow configuration of FIG. 42).

Figure 57:
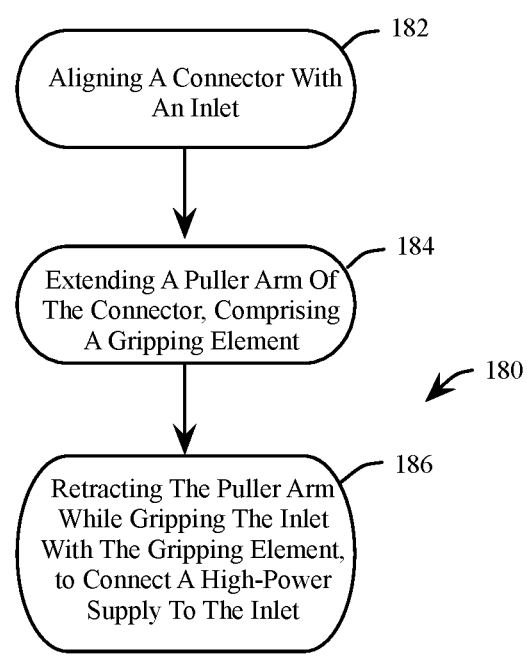
FIG. 57 is a flowchart representation of another method for latching an electrical connector, in accordance with an example embodiment of the present disclosure.

FIG. 57 shows an example embodiment of a method 180 for latching an electrical connector. At 182, a connector (10, 70 or 140) is aligned with an inlet (30 or 110). At 184, a puller arm (12, 72 or 142) of the connector is extended, wherein the puller arm comprises a gripping element (latch pawl 14 or 82; or conversion between narrow and wide configurations of FIG. 42 and FIG. 43 respectively). At 186, the puller arm is retracted while gripping the inlet with the gripping element, to connect a high-power supply to the inlet.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for latching an electrical connector comprising:
    aligning a first colinear axis of a connector with a second colinear axis of an inlet, wherein a first surface of the connector is within a first distance of a second surface of the inlet, the first surface parallel to the second surface and orthogonal to the first colinear axis;
    extending a puller arm of the connector into the inlet to a second distance from the second surface of the inlet, wherein the puller arm comprises a gripping element configured to apply a first compressive force against the inlet;
    retracting the puller arm relative to the connector while applying the first compressive force against the inlet, wherein the puller arm remains in the inlet at the second distance, thereby extending a first electrode of the connector into the inlet to connect the first electrode with a second electrode of the inlet; and
    capturing the gripping element in a captured state preventing the first compressive force from being applied against the inlet.

2. The method of claim 1 further comprising extending a latch pin into a recessed portion of the inlet and through the puller arm to prevent the connector from retracting from the inlet after the gripping element is in the captured state.

3. The method of claim 1 wherein the gripping element is a latch pawl and the compressive force is applied against the inlet by pivoting the latch pawl into a recessed portion of the inlet when the puller arm is at the second distance.

4. The method of claim 3 wherein the gripping element is captured in the captured state by extending the puller arm along a linear path into the inlet to a third distance from the second surface of the inlet, wherein the third distance is greater than the second distance.

5. The method of claim 3 wherein the gripping element is captured in the captured state by extending the puller arm along a helical path into the inlet to a third distance from the second surface of the inlet, wherein the third distance is greater than the second distance.

6. The method of claim 5 wherein the puller arm comprises a first semicircular cross-section, the puller arm coupled along the helical path of a puller arm extender comprising a second semicircular cross-section, wherein extending the puller arm into the puller arm extender induces a relative angular displacement around a shared axis of the puller arm and the puller arm extender, and the gripping element is coupled to the puller arm extender.

7. The method of claim 1 wherein the puller arm comprises an angled surface and the gripping element is a second puller arm configured to slide linearly along the angled surface to change a combined width of the puller arm coupled to the second puller arm, wherein the first compressive force is applied against the inlet when the combined width increases by retracting the second puller arm relative to the puller arm.

8. The method of claim 7 wherein the gripping element is captured by extending the second puller arm relative to the puller arm along to a full length of the angled surface, wherein the combined width is reduced.

9. An apparatus comprising:
    a connector comprising a first surface, the first surface comprising a first colinear axis aligned with a second colinear axis of an inlet during an alignment step, wherein the first surface is within a first distance of a second surface of the inlet, the first surface parallel to the second surface and orthogonal to the first colinear axis;
    a puller arm coupled to the connector and configured to extend into the inlet to a second distance from the second surface of the inlet during a gripping step; and
    a gripping element coupled to the puller arm and configured to apply a first compressive force against the inlet during the gripping step, wherein the puller arm is configured to retract relative to the connector during the gripping step, thereby extending a first electrode of the connector into the inlet to connect the first electrode with a second electrode of the inlet, the gripping element subsequently configured in a captured state to prevent the first compressive force from being applied against the inlet.

10. The apparatus of claim 9 wherein the connector is connected to a high-power supply and the inlet is connected to a battery of an electric vehicle.

11. The apparatus of claim 9 wherein the gripping element is a latch pawl configured to pivot into a recessed portion of the inlet when the puller arm is at the second distance.

12. The apparatus of claim 11 wherein the latch pawl comprises a torsional spring.

13. The apparatus of claim 11 wherein the puller arm comprises a first semicircular cross-section, the puller arm coupled along a helical path of a puller arm extender comprising a second semicircular cross-section, wherein extending the puller arm into the puller arm extender induces a relative angular displacement around a shared axis of the puller arm and the puller arm extender and the gripping element is coupled to the puller arm extender.

14. The apparatus of claim 9 wherein the puller arm comprises an angled surface and the gripping element is a second puller arm configured to slide linearly along the angled surface to change a combined width of puller arm coupled to the second puller arm, wherein the first compressive force is applied against the inlet when the combined width increases by retracting the second puller arm relative to the puller arm.

15. The apparatus of claim 14 wherein the gripping element is configured to be captured by extending the second puller arm relative to the puller arm along to a full length of the angled surface, wherein the combined width is reduced.

16. A method for latching an electrical connector comprising:
- aligning a first colinear axis of a connector with a second colinear axis of an inlet, wherein a first surface of the connector is within a first distance of a second surface of the inlet, the first surface parallel to the second surface and orthogonal to the first colinear axis;
- extending a puller arm of the connector into the inlet to a second distance from the second surface of the inlet, wherein the puller arm comprises a gripping element configured to apply a first compressive force against the inlet; and
- retracting the puller arm relative to the connector while applying the first compressive force against the inlet, wherein the puller arm remains in the inlet at the second distance, thereby extending a first electrode of the connector into the inlet to connect the first electrode with a second electrode of the inlet, wherein the first electrode transfers power to the second electrode from a high-power supply.

17. The method of claim 16 further comprising capturing the gripping element in a captured state to prevent the first compressive force from being applied against the inlet.

18. The method of claim 17 further comprising extending a latch pin into a recessed portion of the inlet and through the puller arm to prevent the puller arm from retracting into the connector after the gripping element is in the captured state.

19. The method of claim 16 wherein the first electrode of the connector is disengaged from the second electrode of the inlet by applying a second compressive force with the puller arm on a third surface of the inlet by extending the puller arm relative to the connector, wherein the second electrode of the inlet is coupled to the third surface and the third surface is parallel to the second surface.

20. The method of claim 16 wherein the first colinear axis of the connector is aligned with a second colinear axis of the inlet using a computer vision system to position the connector relative to one or more alignment marks on the inlet.

\* \* \* \* \*